US012240621B2

(12) United States Patent
Resnick et al.

(10) Patent No.: US 12,240,621 B2
(45) Date of Patent: Mar. 4, 2025

(54) POWER MODULE AND CLUTCH MECHANISM FOR UNMANNED AIRCRAFT SYSTEMS

(71) Applicant: Parallel Flight Technologies, Inc., Ben Lomond, CA (US)

(72) Inventors: Joshua Alan Resnick, Ben Lomond, CA (US); Robert Hulter, Ben Lomond, CA (US); David Adams, Ben Lomond, CA (US); Paul Allen Kele, Soquel, CA (US); Maxwell Lewis Kauker, Soquel, CA (US)

(73) Assignee: Parallel Flight Technologies, Inc., Ben Lomond, CA (US)

( * ) Notice: Subject to any disclaimer, the term of this patent is extended or adjusted under 35 U.S.C. 154(b) by 68 days.

(21) Appl. No.: 17/742,208

(22) Filed: May 11, 2022

(65) Prior Publication Data

US 2023/0365268 A1 Nov. 16, 2023

(51) Int. Cl.
*B64D 35/08* (2006.01)
*B64C 39/02* (2023.01)
(Continued)

(52) U.S. Cl.
CPC ............ *B64D 35/08* (2013.01); *B64C 39/024* (2013.01); *B64D 27/04* (2013.01); *B64D 27/24* (2013.01);
(Continued)

(58) Field of Classification Search
CPC ...... B64C 39/024; B64D 27/04; B64D 27/24; B64D 33/08; B64D 35/02; B64D 35/08;
(Continued)

(56) References Cited

U.S. PATENT DOCUMENTS 2,229,657 A * 1/1941 Larason ................. B64D 27/00
464/158
2,455,251 A * 11/1948 Hersey .................. F04D 27/002
415/13

(Continued)

OTHER PUBLICATIONS

PCT/US2023/021941, "International Search Report and Written Opinion", Sep. 19, 2023, 11 pages.

(Continued)

*Primary Examiner* — Brady W Frazier
(74) *Attorney, Agent, or Firm* — Kilpatrick Townsend & Stockton LLP

(57) ABSTRACT

One variation of a system for generating thrust at an aerial vehicle includes: a primary electric motor; a rotor coupled to the motor; an internal-combustion engine; a disengagement mechanism interposed between the motor and an output shaft of the internal-combustion engine; an cooling shroud defining a shroud inlet between the rotor and the internal-combustion engine, extending over the internal-combustion engine, and defining a cooling shroud outlet opposite the rotor; a cooling fan coupled and configured to displace air through the cooling shroud; and a local controller configured to receive a rotor speed command specifying a target rotor speed, adjust a throttle setpoint of the internal-combustion engine according to the target rotor speed and a state of charge of a battery in the aerial vehicle, and drive the primary electric motor to selectively output torque to the rotor and to regeneratively brake the rotor according to the target rotor speed.

16 Claims, 15 Drawing Sheets

(51) Int. Cl.
  *B64D 27/02* (2006.01)
  *B64D 27/04* (2006.01)
  *B64D 27/24* (2024.01)
  *B64D 33/02* (2006.01)
  *B64D 33/08* (2006.01)
  *B64D 35/02* (2024.01)
  *B64U 30/20* (2023.01)
  *B64U 50/19* (2023.01)
  *B64U 50/11* (2023.01)

(52) U.S. Cl.
  CPC ............ *B64D 33/08* (2013.01); *B64D 35/02* (2013.01); *B64D 27/026* (2024.01); *B64D 2033/024* (2013.01); *B64U 30/20* (2023.01); *B64U 50/11* (2023.01); *B64U 50/19* (2023.01)

(58) Field of Classification Search
  CPC ............ B64U 2027/026; B64U 30/20; B64U 2033/024; B64U 50/11; B64U 50/19
  USPC .......................................................... 244/57
  See application file for complete search history.

(56) References Cited

U.S. PATENT DOCUMENTS

| | | | |
|---|---|---|---|
| 2,908,189 A * | 10/1959 | Chapman | F02C 7/275 60/788 |
| 10,494,117 B2 | 12/2019 | Bosma | |
| 10,830,149 B2 * | 11/2020 | Snape | F02K 3/075 |
| 11,148,820 B1 | 10/2021 | Resnick et al. | |
| 11,255,321 B1 | 2/2022 | Harris et al. | |
| 11,629,649 B2 * | 4/2023 | Davis | G01P 3/443 60/226.1 |
| 2003/0094537 A1 * | 5/2003 | Austen-Brown | B64C 29/0033 244/7 R |
| 2006/0248873 A1 | 11/2006 | Parks et al. | |
| 2008/0112798 A1 * | 5/2008 | Seitzer | F01D 11/24 60/262 |
| 2011/0036939 A1 * | 2/2011 | Easter | B64C 39/04 244/46 |
| 2012/0111022 A1 * | 5/2012 | Dyer | F02C 7/32 60/788 |
| 2012/0112575 A1 * | 5/2012 | Blewett | F01M 5/002 310/62 |
| 2014/0056718 A1 * | 2/2014 | Beers | F04D 25/06 416/97 R |
| 2014/0214293 A1 | 7/2014 | Mori et al. | |
| 2014/0220873 A1 | 8/2014 | Bleechmore et al. | |
| 2019/0263519 A1 | 8/2019 | Argus | |
| 2020/0324894 A1 | 10/2020 | Fredericks et al. | |
| 2021/0348565 A1 * | 11/2021 | Davis | F01D 25/16 |
| 2022/0033097 A1 | 2/2022 | Botti et al. | |
| 2022/0106050 A1 | 4/2022 | Resnick et al. | |

OTHER PUBLICATIONS

PCT/US2023/021941 , "Invitation to Pay Additional Fees and, Where Applicable, Protest Fee", Jul. 14, 2023, 2 pages.

U.S. Appl. No. 17/135,735 , "Notice of Allowance", Aug. 30, 2021, 10 pages.

* cited by examiner

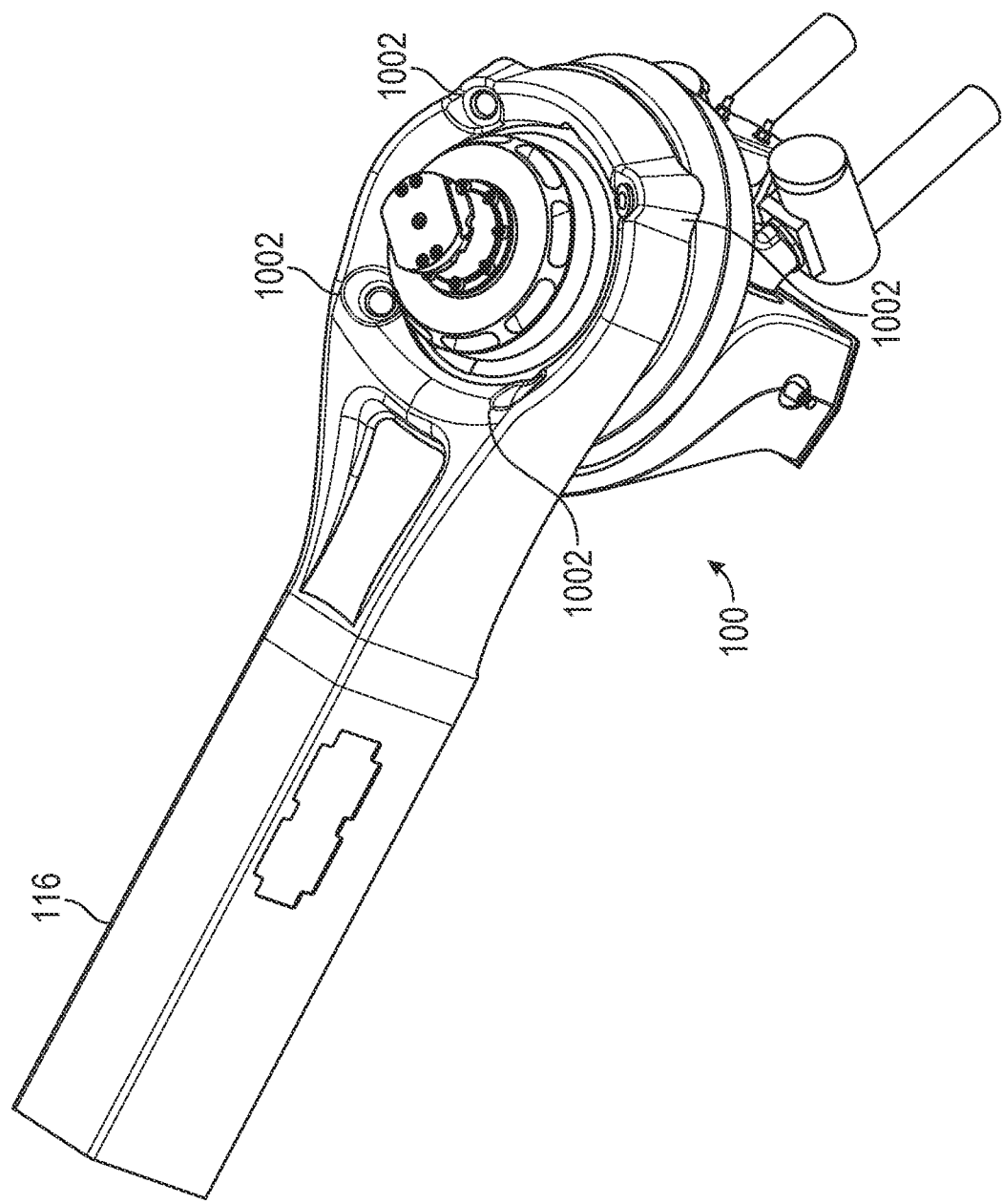

POWER MODULE AND CLUTCH MECHANISM FOR UNMANNED AIRCRAFT SYSTEMS

CROSS REFERENCE TO RELATED APPLICATIONS

This application is related to U.S. application Ser. No. 17/135,735, filed Dec. 28, 2020, issued as U.S. Pat. No. 11,148,820, entitled "SYSTEM DEFINING A HYBRID POWER UNIT FOR THRUST GENERATION IN AN AERIAL VEHICLE AND METHOD FOR CONTROLLING THE SAME", which is hereby incorporated by reference in its entirety and for all purposes.

TECHNICAL FIELD

This disclosure relates generally to the field of aircraft power unit systems and more specifically to a new and useful system for defining a hybrid power unit for thrust generation in an aerial vehicle and a new and useful method for controlling the same in the field of aircraft power unit systems.

The torque output response time of an internal-combustion engine may be too slow to achieve minimum stability controls and maneuverability for a multi-rotor aircraft. For example, a two- or four-cycle multi-cylinder gasoline engine may not be capable of a large (e.g., twice) change in crankshaft speed and/or output torque in a time domain of tens or hundreds of milliseconds, which may otherwise be necessary to maintain control of multi-rotor aircraft—less than 500 kilograms in total laden weight—in the presence of local air currents and updrafts. Furthermore, an internal-combustion engine: may be more prone to failure than an electric motor; may exhibit peak operating efficiency within a relatively narrow range of output torque and engine speed combinations; but may operate on a liquid fuel characterized by (much) higher energy density than an electric battery.

Conversely, the power density of an electric battery can be relatively low such that an increased size of a battery in the aerial vehicle may yield a relatively limited increase in operating time of the primary electric motor while significantly increasing the aerial vehicle's weight and reducing (relatively) the payload capacity of the aerial vehicle. However, the primary electric motor: can be capable of large (e.g., twice) changes in output speed and output torque on very short time scales (e.g., tens or hundreds of milliseconds); can exhibit less tendency for failure and fewer failure modes than the internal-combustion engine; and can operate at or near peak efficiency over a (much) wider range of output torque and motor speed combinations than the internal-combustion engine.

SUMMARY

In some aspects, a hybrid power unit includes: a primary electric motor including a motor output shaft; a primary thrust-providing propeller coupled to the motor output shaft; an internal-combustion engine comprising an output element coupled to a torsion shaft that is coupled to a transmission element; a disengagement mechanism interposed between the transmission element and the motor output shaft and configured to selectively transfer torque between the transmission element and the motor output shaft; an cooling shroud extending over the internal-combustion engine and defining a shroud inlet and a cooling shroud outlet; and a cooling fan coupled to the shroud inlet and configured to displace air through the cooling shroud and over the internal-combustion engine and through the cooling shroud outlet thereby providing cooling and additional thrust.

In some aspects, the cooling shroud outlet is further configured to provide thrust-vectoring.

In some aspects, the disengagement mechanism is a bi-directional clutch.

In some aspects, an electrical solenoid in the disengagement mechanism to selectively engage or disengage the motor output shaft with or from the planetary gearbox.

In some aspects, a speed of the cooling fan is directly proportional to a speed of the internal-combustion engine.

In some aspects, one or more dogs of the disengagement mechanism are angled with respect to a top surface of the disengagement mechanism in order to reduce friction between faces of the disengagement mechanism to allow for disconnection under load.

In some aspects, a default position of the disengagement mechanism is a closed configuration that couples the torsion shaft to the motor output shaft via a speed reduction mechanism.

In some aspects, a magnetic solenoid configured to disengage and re-engage the disengagement mechanism, wherein a magnetic coil of the magnetic solenoid is energized to disengage a dog portion of the disengagement mechanism and cooperates with a permanently magnetized ring to keep the disengagement mechanism disengaged even after the magnetic coil is de-energized.

In some embodiments, a manual lever can be used to disengage and re-engage the disengagement mechanism.

In some aspects, the torsion shaft further comprises: quill coaxial shafts to reduce an amplitude of torque pulses from the internal-combustion engine, the quill coaxial shafts comprising: an inner coaxial shaft coupled to the internal combustion engine output shaft; and an outer coaxial shaft encircling the inner coaxial shaft and connected at a distal end of the outer coaxial shaft to the inner coaxial shaft and at a proximal end of the outer coaxial shaft coupled to a sun gear, wherein the outer coaxial shaft and inner coaxial shaft transmit torque from the internal-combustion engine to the planetary gearbox.

In some aspects, the primary electric motor is configured to transmit torque bi-directionally to the motor output shaft and from the motor output shaft.

In some aspects, a position sensing system can be configured to detect a relative position of a plurality of dogs of the disengagement mechanism prior to re-engaging.

In some aspects, a variable cooling shroud inlet can be configured to modulate cooling of the internal-combustion engine by modulating a level of airflow through the cooling shroud.

In some aspects, a plurality of mounting arms and a plurality of Dynafocal mounts are configured to secure each of the plurality of hybrid power units to each of the plurality of mounting arms.

In some aspects, a method of controlling a hybrid power unit includes: receiving, at a local controller, a target total thrust value; converting, at the local controller, the target total thrust value into a target speed for a propeller; transmitting, by the local controller, the target speed to a motor speed controller for a primary electric motor; receiving, at the motor speed controller, a sensor value for a current speed for the propeller; generating, at the motor speed controller, a signal to a primary electric motor to selectively output torque to a rotor and regeneratively brake the rotor according to the target speed for the propeller (e.g. a rotor); receiving, at the local controller, a module current set point based at least in part on a state of charge of a battery; determining, at the local controller, a throttle set point based in part on the target speed of the propeller and the module current set point; and adjusting, at the local controller, a throttle set point of an internal-combustion engine of the hybrid power unit based at least in part on the target speed for the propeller and the module current set point.

In some aspects, the method includes generating a final throttle set point signal based at least in part on the throttle set point; and sending the final throttle set point signal directly or indirectly to a throttle actuator.

In some aspects, the method includes estimating, at the local controller, a secondary thrust output from a shroud output based at least in part on a rotation speed of an internal-combustion engine.

In some aspects, the module current set point is based at least in part on a second module current set point from a second local controller.

In some aspects, the method includes detecting, via one or more sensors, a condition of the primary electric motor or a secondary internal-combustion engine; and generating a signal in response to the detected condition.

In some aspects, an aerial vehicle including a plurality of hybrid modules, wherein: each module of the plurality of hybrid modules comprises an electric motor, an internal-combustion engine, and a local controller configured to perform the method of claim 16, wherein for each hybrid module, the local controller communicates with local controllers of other hybrid modules on the aerial vehicle.

These and other embodiments of the disclosure, along with many of its advantages and features, are described in more detail in conjunction with the text below and corresponding figures.

BRIEF DESCRIPTION OF THE DRAWINGS

FIG. 10 illustrates an arm that retains a hybrid power unit via a Dynafocal mount.

Like reference, symbols in the various drawings indicate like elements, in accordance with certain example implementations. In addition, multiple instances of an element may be indicated by following a first number for the element with a letter or a hyphen and a second number.

DETAILED DESCRIPTION OF THE DRAWINGS

Figure 1:
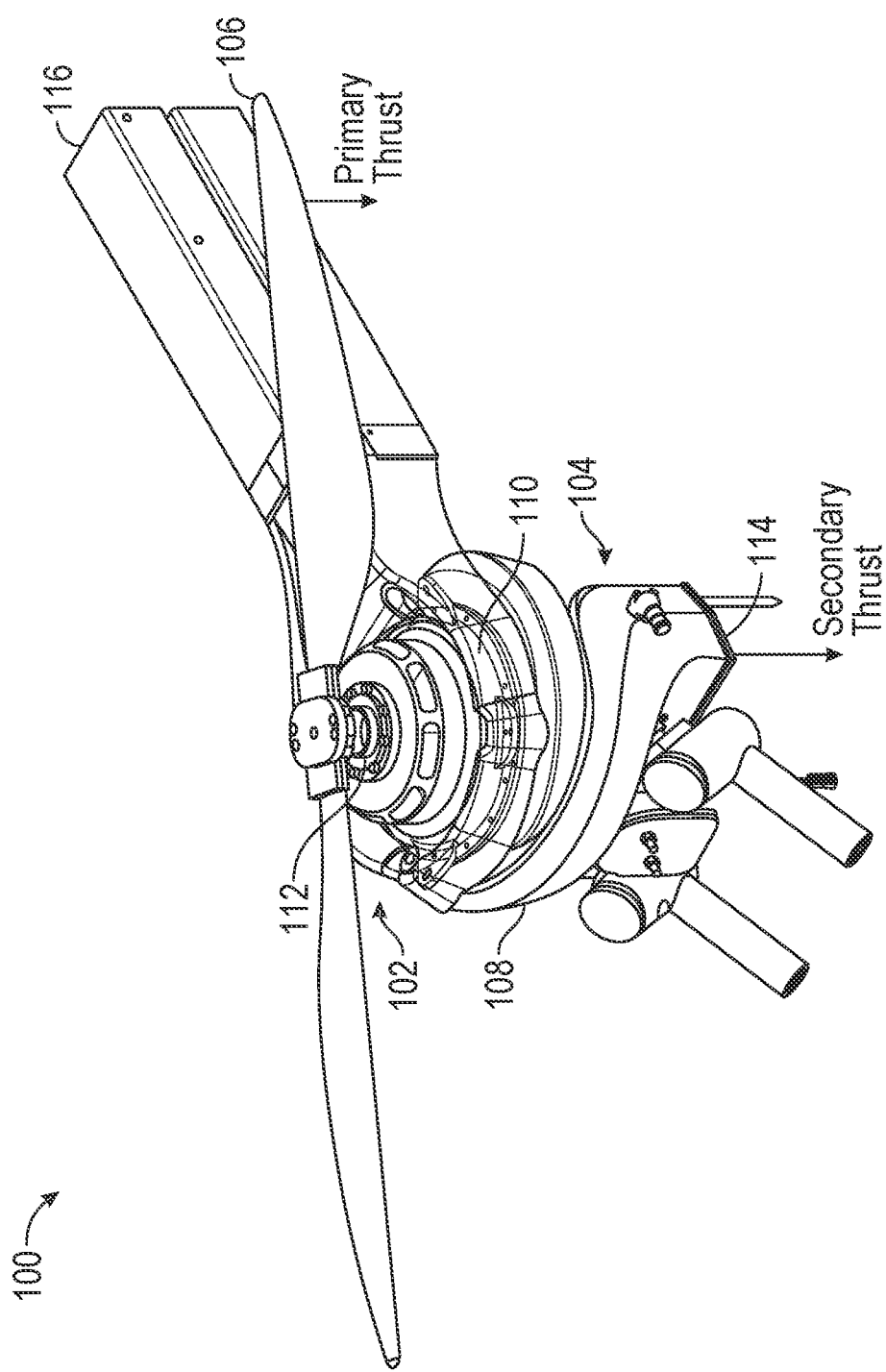
FIG. 1 illustrates a hybrid view of a hybrid power unit, according to aspects of the disclosure.

The following detailed description of example implementations refers to the accompanying drawings. The same reference numbers in different drawings may identify the same or similar elements.

The following description of embodiments of the disclosure is not intended to limit the disclosure to these embodiments but rather to enable a person skilled in the art to make and use this disclosure. Variations, configurations, implementations, example implementations, and examples described herein are optional and are not exclusive to the variations, configurations, implementations, example implementations, and examples they describe. The disclosure described herein can include any and all permutations of these variations, configurations, implementations, example implementations, and examples.

Generally, a hybrid power unit 100 can be configured for installation on an aerial vehicle (e.g., a "drone" or unmanned aerial vehicle (UAV)") to produce a controlled amount of thrust via a primary electric motor 102 powered by a battery 194 in the aerial vehicle and via an internal-combustion engine powered by a liquid fuel. The hybrid power unit 100 can execute steps of a method to selectively adjust a torque output of the primary electric motor 102 and the internal-combustion engine 104 in order to achieve target total thrust output(s) specified by a primary flight controller 180 in the aerial vehicle and to maintain state of change of a battery 194 in the aerial vehicle during a flight.

In particular, the hybrid power unit 100 can include an internal-combustion engine 104 coupled to a rotor 106 and configured to operate on a liquid fuel that exhibits high energy density, thereby enabling the hybrid power unit 100 to produce a large amount of thrust and thus enabling the aerial vehicle to achieve a large payload capacity over an extended flight duration. The rotor 106 can be a primary thrust-providing propeller. However, the internal-combustion engine 104 may also be capable of only relatively slow changes in output torque responsive to changes in its throttle setpoint. Therefore, the hybrid power unit 100 can also include a primary electric motor 102 coupled to the rotor 106 and to the internal-combustion engine 104 and capable of rapid changes in output torque and thus capable of rapidly accelerating and braking the rotor 106 to a target rotor speed as specified by a primary flight controller 180. In contrast, the output torque of the internal-combustion engine 104 changes over longer timescales in response to changes in its throttle setpoint. The internal-combustion engine 104 and the primary electric motor 102 can thus cooperate to achieve extended flight times, increase lift and payload capacity, high maneuverability, and robust stability control for an aerial vehicle incorporating one or more instances of the hybrid power unit 100, such as a multi-rotor wingless aerial vehicle (e.g., a "quadcopter").

Thus, the hybrid power unit 100 can include both the internal-combustion engine 104 and the primary electric motor 102 connected in parallel to the rotor 106, and the local controller 1302 can execute steps of a method to achieve rapid changes in rotor speed—responsive to rotor speed commands received from a primary flight controller 180; and to leverage high energy density of liquid fuels to maintain high thrust output from the rotor 106 and to maintain a target state of charge of the battery 194 over long timescales by automatically adjusting the throttle setpoint of the internal-combustion engine 104. Therefore, the hybrid power unit 100 can execute steps of a method to: enable a lower-capacity (and therefore lighter) battery 194 to supply power to a larger primary electric motor 102 over longer flight times in an aerial vehicle carrying a greater payload. More specifically, the hybrid power unit 100 can include both the internal-combustion engine 104 and the primary electric motor 102 connected in parallel to the rotor 106 in order: to limit total system weight while enabling a large range of thrust outputs of the hybrid power unit 100 over long time intervals (e.g., hours) by leveraging high energy capacity of liquid fuel; to achieve rapid rotor speed changes and therefore, rapid thrust output changes for tight and consistent stability control by leveraging near-instantaneous changes in torque output of the primary electric motor 102; and to maintain the internal-combustion engine 104 near a peak operating efficiency over a range of output thrusts while maintaining a state of charge of the battery 194 in order to extend an operating range of the aerial vehicle by selectively switching the primary electric motor to power output and regenerative braking states.

Furthermore, the hybrid power unit 100 can include: an cooling shroud 108 defining a shroud inlet between the rotor 106 and the internal-combustion engine 104, extending around the internal-combustion engine 104, and defining an outlet below the internal-combustion engine 104 opposite the rotor 106; and a cooling fan 404 configured to draw air into the shroud inlet, through the cooling shroud 108 to cool the internal-combustion engine 104, and out of the cooling shroud outlet 114 to produce additional thrust augmenting the (primary) thrust generated by the rotor 106.

Figure 4:
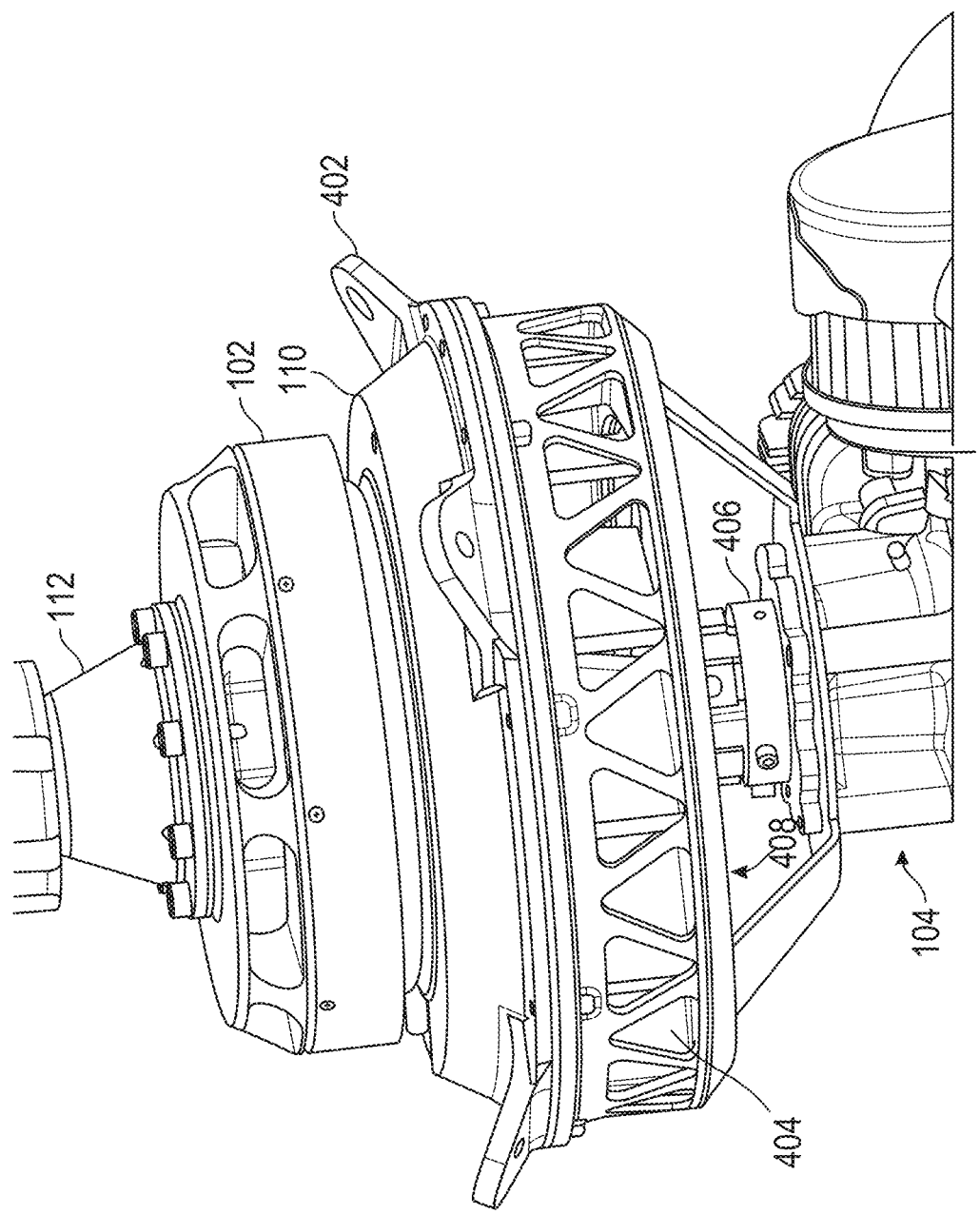
FIG. 4 illustrates a hybrid power unit according to various embodiments of the disclosure.

The cooling shroud 108 can be arranged about the internal-combustion engine 104. A cooling fan 404, as shown in FIG. 4, can be configured to force air through the cooling shroud 108 in order to cool the internal-combustion engine 104.

Figure 6:
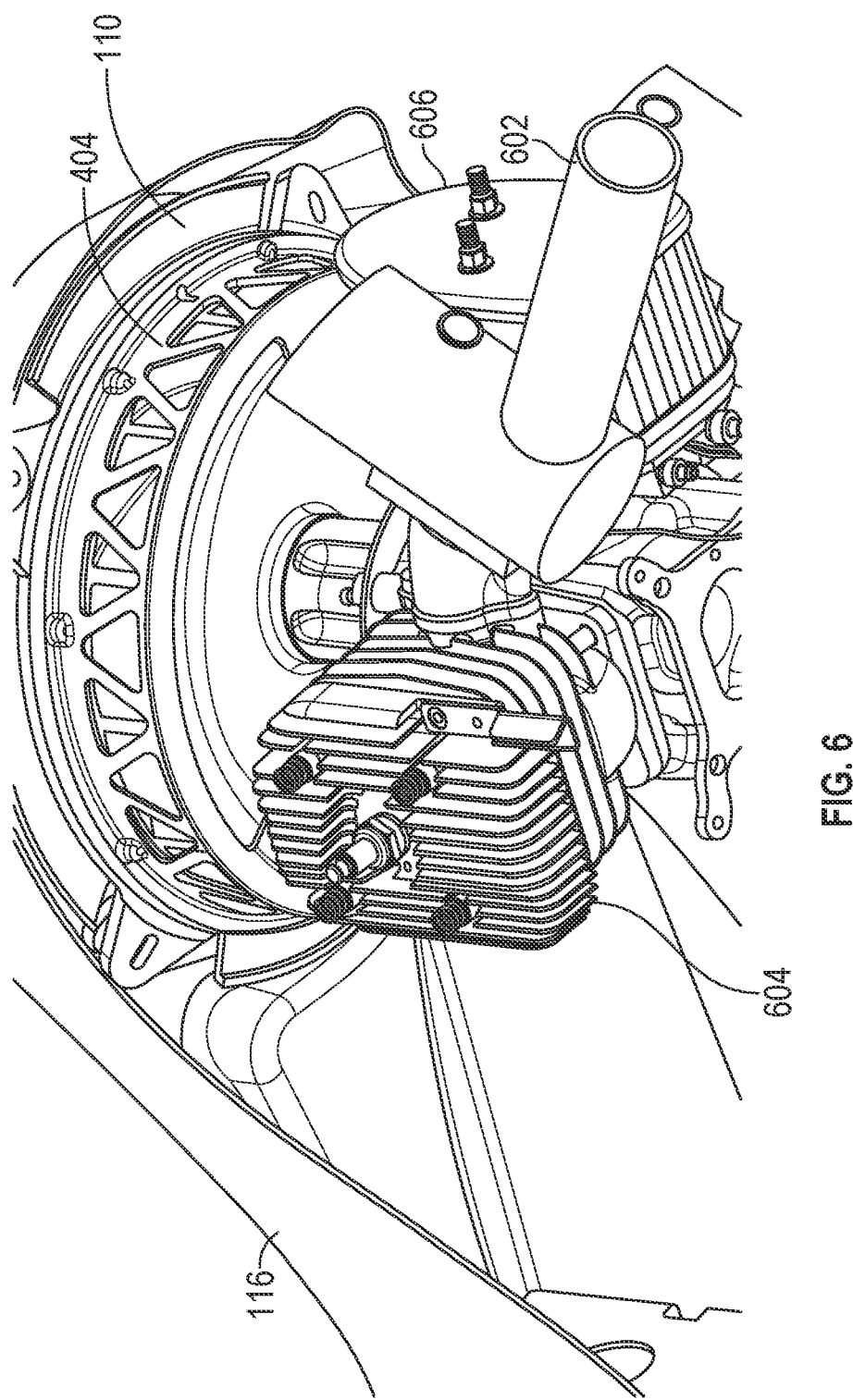
FIG. 6 illustrates an underside view of a portion of a hybrid power unit according to various embodiments of the disclosure.

The cooling shroud 108 can be arranged over each cylinder head 604, as shown in FIG. 6, (or cylinder bank) of the internal-combustion engine 104 and extending above and below the cylinder head 604 (or cylinder bank) parallel to the crankshaft of the internal-combustion engine 104.

However, the cooling shroud 108 can define any other form or geometry, and the hybrid power unit 100 can include any other configuration of cooling fans 404 configured to draw air through the cooling shroud 108.

The hybrid power unit 100 can be configured to be installed in a vertical orientation (i.e., with axis of rotation of the rotor 106 normal to the ground plane) in a multi-rotor vertical-takeoff-and-landing aircraft, such as in place of a solely-electric power unit. For example, four instances of hybrid power unit 100 can be installed at each rotor location in a four-rotor "quadcopter." However, the hybrid power unit 100 can be installed in vertical or horizontal orientations in a single- or multi-rotor aircraft of any other configuration including configurations wherein the orientation of the hybrid power unit can be adjusted to one or more angles between vertical and horizontal.

Figure 2:
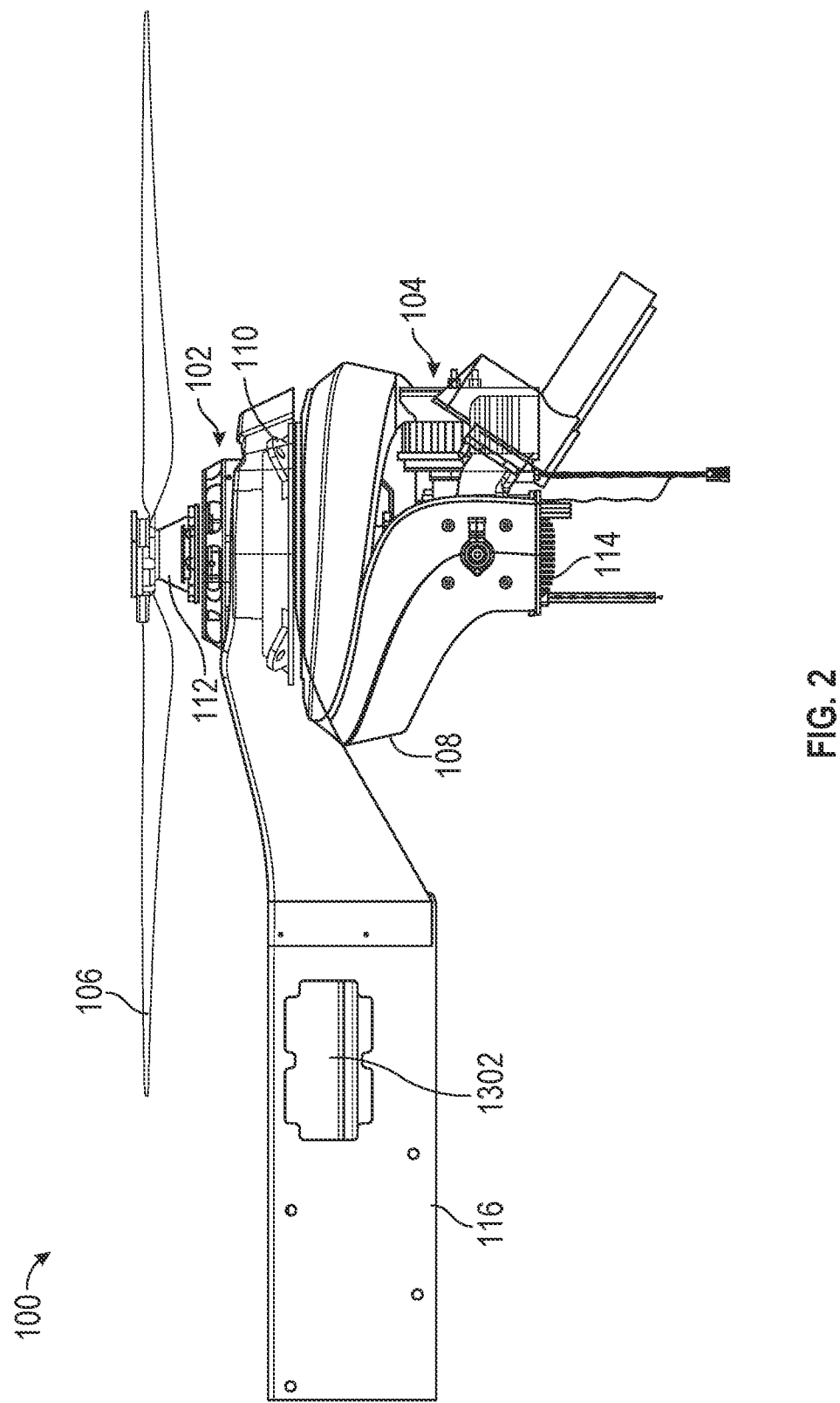
FIG. 2 illustrates a profile view of a hybrid power unit, according to aspects of the disclosure.

As shown in FIGS. 1 and 2, the hybrid power unit 100 for thrust generation in an aerial vehicle can include a primary electric motor 102. FIG. 1 illustrates a hybrid view of a hybrid power unit. FIG. 2 illustrates a profile view of a hybrid power unit. The primary electric motor 102 can include a motor output 112 that provides a torque to a propeller/rotor 106. The hybrid power unit 100 can include an internal-combustion engine 104. The internal-combustion engine 104 can be connected to a motor output 112 (e.g., an engine output shaft) that connects the internal-combustion engine 104 to the rotor 106 through a transmission element 110. The internal-combustion engine 104 can supplement, moderate, and if required replace the torque from the primary electric motor 102.

As shown in FIGS. 1 and 2, the hybrid power unit 100 can include a rotor, such as a two- or three-blade propeller including fixed and variable pitch blades. The rotor 106 can be mounted to the driveshaft, such as in the form of a stub axle coupled to the motor output 112 of the primary electric motor 102 or integrated into an external-rotor housing of the primary electric motor 102. Alternatively, the rotor 106 can be mounted directly to the motor output 112 of the primary electric motor 102 or to the external-rotor housing of the primary electric motor 102.

Figure 8A:
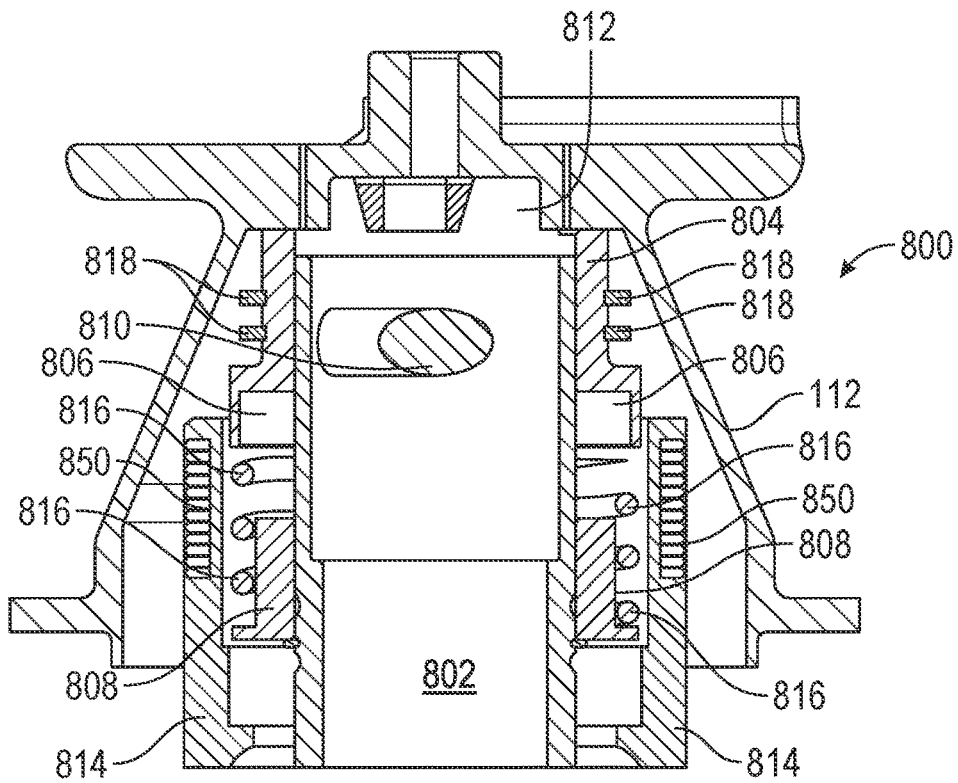
FIG. 8A illustrates a disengagement mechanism according to an embodiment of the disclosure in an engaged state.

The hybrid power unit 100 can include a disengagement mechanism 804, as shown in FIG. 8A, interposed between the transmission element and the motor output shaft and configured to selectively transfer torque between the transmission element and the motor output shaft. In some embodiments, the disengagement mechanism can be a clutch. In various embodiments, the disengagement mechanism can be a bi-directional clutch.

The hybrid power unit 100 can include a primary electric motor 102, such as a brushed alternating current (AC) or direct current (DC) electric motor or a permanent-magnet brushless AC or DC electric motor.

Generally, the primary electric motor 102 functions as a motor-generator and can be sized to output a maximum torque sufficient to fulfill thrust requirements of the hybrid power unit 100 for a configuration of the aerial vehicle in which the hybrid power unit 100 is installed. For example, the primary electric motor 102 can be sized to produce a maximum thrust equal to one-quarter of the total maximum loaded weight of the aerial vehicle plus a safety factor (e.g., 33%). For example, for the aerial vehicle that defines a quad-copter with four instances of the hybrid power unit 100, weighing about 65 kilograms empty, and rated for a maximum payload of approximately 45 kilograms, as described above, the primary electric motor 102—in each of the four instances of the hybrid power unit 100 that can be installed in this aerial vehicle—can be sized to produce a thrust of about 500 Newtons when paired with the fixed rotor.

Figure 13:
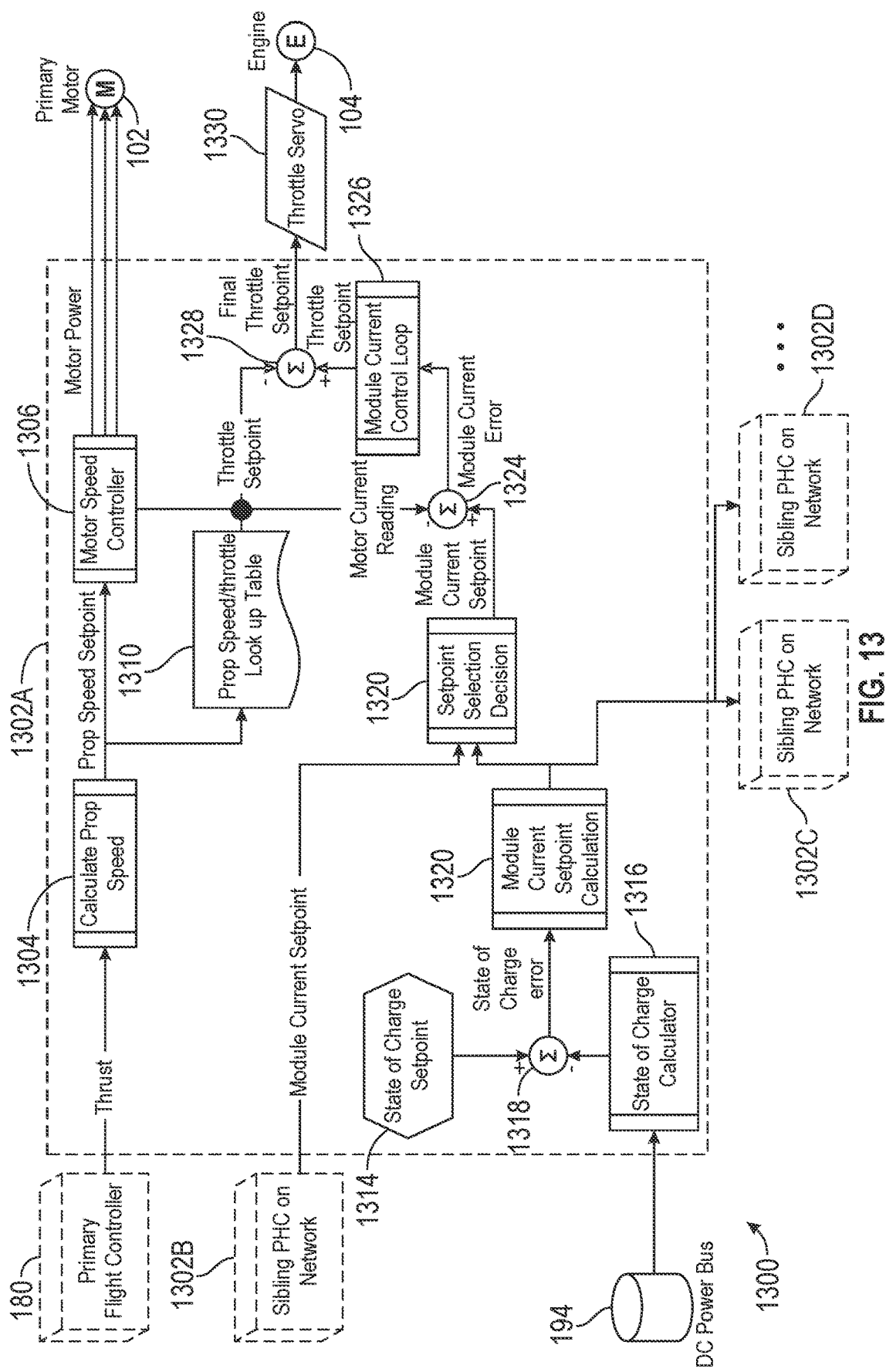
FIG. 13 illustrates a flowchart to control a total thrust output of a hybrid power unit.

The hybrid power unit 100 can also include an electronic motor speed controller 1306, as shown in FIG. 13, interposed between the primary flight controller 180 (or the local controller) and the primary electric motor 102. Upon receipt of a rotor speed command from the primary flight controller 180 (or from the local controller), the electronic motor speed controller 1306 can implement closed-loop controls to automatically adjust a voltage and/or commutation to the primary electric motor 102 to rapidly drive the rotor 106 to a new target rotor speed specified in this rotor speed command and to then maintain the rotor 106 at this target motor speed until a new command—specifying a different target motor speed—is received from the primary flight controller 180 (or from the local controller). For example, to accelerate the rotor 106 responsive to a rotor speed command specifying a higher target rotor speed, the electronic motor speed controller can increase a voltage and commutation speed of the primary electric motor 102. Conversely, to decelerate the rotor 106 responsive to a rotor speed command specifying a lower target rotor speed, the electronic motor speed controller can transition the primary electric motor 102 into a generate mode to regeneratively brake the rotor 106.

The hybrid power unit 100 can include a cooling shroud 108 extending over the internal-combustion engine 104 and defining a shroud inlet and a cooling shroud outlet 114. The cooling shroud 108 can extend over one or more cylinder heads of the internal-combustion engine 104.

The hybrid power unit 100 can include a cooling fan 404, as shown in FIG. 4, coupled to the shroud inlet 408, as shown in FIG. 4, and configured to displace air through the cooling shroud 108 and over the internal-combustion engine 104 and through the cooling shroud outlet 114 thereby providing cooling and additional thrust. In some embodiments, the cooling fan 404, as shown in FIG. 4, can also be configured to act as a flywheel coupled with the engine output element 406.

The hybrid power unit 100 also includes a local controller 1302 configured to: receive a rotor speed command specifying a target rotor speed; adjust a throttle setpoint of the internal-combustion engine 130 according to the target rotor speed and a state of charge of a battery 194 in the aerial vehicle; and drive the primary electric motor 102 to selectively output torque to the rotor 106 and to regeneratively brake the rotor 106 according to the target rotor speed.

In one embodiment, the rotor 106 is configured to generate a first thrust; and the cooling fan 404 (illustrated in FIG. 4) is configured to displace air through the cooling shroud 108 to cool the cylinder head 604 (illustrated in FIG. 6) and output a second thrust, from the cooling shroud outlet 114, to augment the first thrust. In this variation, the local controller 1302 can be configured to: access a target total thrust; estimate the second thrust, output from the cooling shroud outlet 114, based on a cooling fan speed of the cooling fan; calculate a target rotor speed of the rotor 106 based on the target total thrust and the second thrust; adjust a throttle setpoint of the internal-combustion engine 104 according to the target rotor speed; and drive the primary electric motor 102 to selectively output torque to the rotor 106 and regeneratively brake the rotor 106 according to the target rotor speed.

Figure 3:
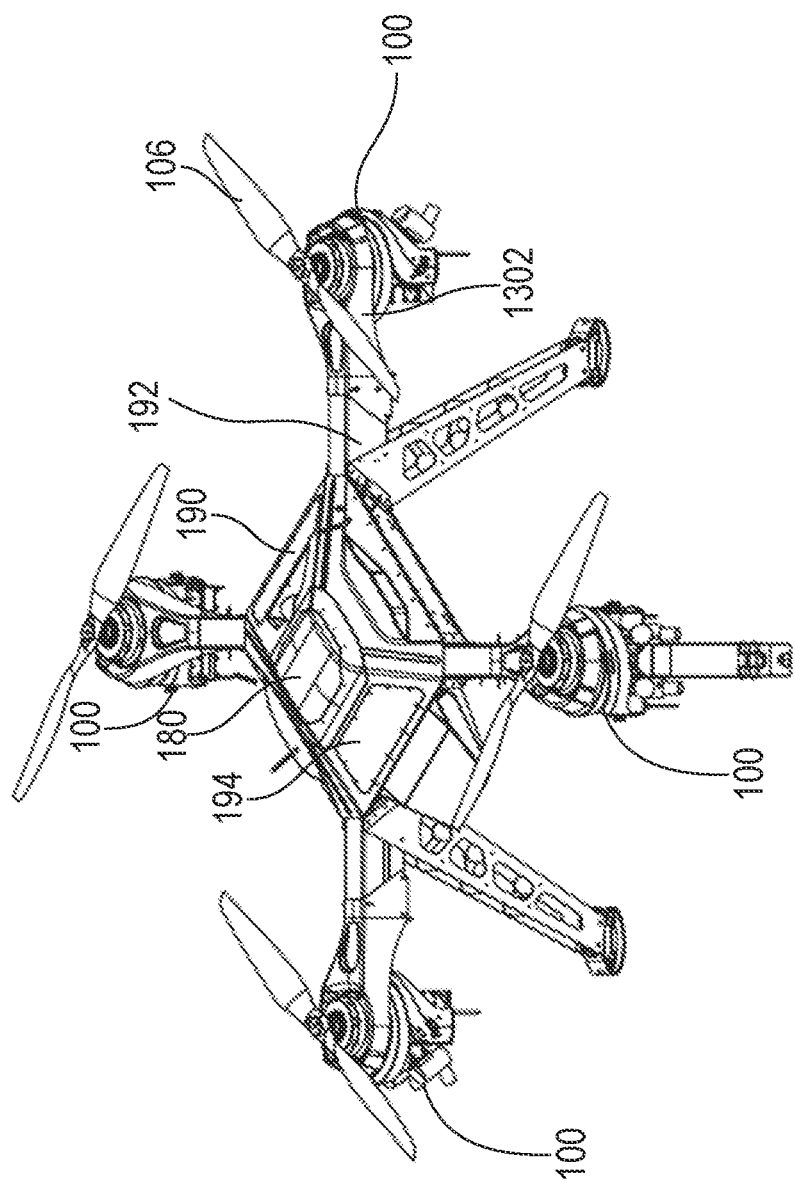
FIG. 3 illustrates multiple instances of a hybrid power unit installed on or integrated into a multi-rotor, aerial vehicle to generate lift and to maneuver the aerial vehicle.

As described above and shown in FIG. 3, multiple instances of the hybrid power unit 100 can be installed on or integrated into a multi-rotor aerial vehicle to generate lift and to maneuver the aerial vehicle. For example, each instance of the hybrid power unit 100 may be coupled to a chassis 190 of the aerial vehicle via a mounting arm 116.

In one implementation, the multi-rotor aerial vehicle includes: a chassis 190; a primary flight controller 180; and a set of arms 116 extending outwardly from the central hub. In this implementation, the central hub can house: a battery 194 and a power bus; a fuel cell and fuel rail; and a data bus and wireless communication module coupled to the primary flight controller 180. The aerial vehicle can also include a camera; a payload mount; and/or a lifting hook, etc.

For example, the aerial vehicle can include four arms 116 extending outwardly from the central hub by a linear distance of approximately one meter and arranged at a radial offset distance of approximately 90° to form a quadcopter chassis 190 approximately two meters in width. In this example, one instance of the hybrid power unit 100 can be mounted to the distal end of each rotor arm 116. Furthermore, for each instance of the hybrid power unit 100: a power line can be connected between the power bus and the instance of the hybrid power unit 100 to source power to the local controller 1302, the primary electric motor, and various sensor and actuators of the hybrid power unit 100. A fuel line can be connected between the fuel rail and an injection system in the internal-combustion engine 104 in this instance of the hybrid power unit 100. A data line can be connected between the data bus and the local controller 1302 in this instance of the hybrid power unit 100 to enable the local controller 1302 to receive rotor speed commands from the primary flight controller 180 and to access a state of charge of the battery 194.

Thus, in this example, the hybrid power unit 100 can include a mount (e.g., a molded composite mount, a folded-sheet metal mount) configured to transiently couple to an arm 116 of the aerial vehicle and to locate the rotor 106 in a vertical orientation on the arm 116. The primary electric motor and the internal-combustion engine 104 can be fixed to this mount, and the local controller 1302 can be similarly fixed to and/or located within this mount. The primary electric motor 102, the rotor 106, the internal-combustion engine 104, the cooling shroud 108, the cooling fan, and the local controller 1302, etc. can thus form a first power unit mounted to the chassis 190 of the aerial vehicle at a first power unit location. A second instance of the hybrid power unit 100 can similarly form a second power unit mounted to the chassis 190 of the aerial vehicle at a second power unit location.

Therefore, in this implementation, the aerial vehicle can include multiple instances of the hybrid power unit 100, and the local controller 1302 (and the electronic motor speed controller) in each instance of the hybrid power unit 100 can execute various methods to realize target rotor speeds—specified in rotor speed command received from the primary flight controller 180—on short timescales (e.g., in tens or hundreds of milliseconds). This instance of the hybrid power unit 100 can thus directly supplant a non-hybrid electric aerial vehicle power unit module by utilizing a rotor speed command and rapidly executing this rotor speed command.

However, the local controller 1302 (and the electronic motor speed controller) in this instance of the hybrid power unit 100 can also execute additional steps of the method to control a throttle setpoint of the internal-combustion engine throughout a flight in order to reduce power consumption by the primary electric motor 102, maintain a state of charge of the battery 194, operate the internal-combustion engine 104 near a peak operating (e.g., combustion, thermal) efficiency, and thus extend a range of the aerial vehicle given a prescribed mass of fuel during this flight. Furthermore, by leveraging the primary electric motor 102 to achieve rapid changes in the speed of the rotor 106 (and to smooth torque output of the internal-combustion engine 104) and operating the primary electric motor 102 as a backup drive system for the rotor 106 in the event of an engine failure (e.g., flame out, piston failure, unresponsive fuel injection or carburetor throttle), the hybrid power unit 100 can enable the aerial vehicle to achieve a high degree of maneuverability, efficient and rapid stability control, and long flight times (e.g., about two hours) with large payloads (e.g., twice an unladen weight of the aerial vehicle) despite a relatively small (i.e., low-capacity) battery 194.

In the foregoing example, the aerial vehicle can include a battery 194 sized to supply full power to the primary electric motor 102 in one or more of the four instances of the hybrid power unit 100 in the aerial vehicle—carrying a maximum payload—for a period of five minutes when charged to a target state of charge (e.g., 70% or between 70% and 80% of full battery 194 charge), thereby enabling the aerial vehicle to land from a maximum altitude (e.g., 1,000 meters) following total internal combustion engine failure in each of the four instances of the hybrid power unit 100. However, in this example, the two-meter-wide aerial vehicle may weigh approximately 130 kilograms when fully fueled for a two-hour flight with a payload of around 45 kilograms.

Thus, the hybrid power unit 100 can include both the internal-combustion engine 104 and the primary electric motor 102 connected to a rotor, and the local controller 1302 can execute a method to achieve rapid changes in rotor speed—responsive to rotor speed commands received from a primary flight controller 180—by controlling mode and torque output (e.g., torque assistance and regenerative braking) of the primary electric motor 102; and to leverage high energy density of liquid fuels to maintain high thrust output from the rotor 106 and to maintain a target state of charge of the battery 194 over long timescales by automatically adjusting the throttle setpoint of the internal-combustion engine 104. Therefore, the hybrid power unit 100 can execute steps of the method in order to: enable a lower-capacity (and therefore lighter) battery 194 to supply power to a larger primary electric motor 102 over longer flight times in an aerial vehicle carrying a greater payload. More specifically, the hybrid power unit 100 can include both the internal-combustion engine 104 and the primary electric motor 102 connected in parallel to the rotor 106 in order: to limit total system weight while enabling a large range of thrust outputs of the hybrid power unit 100 over long time intervals (e.g., hours) by leveraging high energy capacity of liquid fuel; to achieve rapid rotor speed changes and therefore rapid thrust output changes for tight and consistent stability control by leveraging near-instantaneous changes in torque output of the primary electric motor 102; and to maintain the internal-combustion engine 104 near a peak operating efficiency over a range of output thrusts while maintaining a state of charge of the battery 194 in order to extend an operating range of the aerial vehicle by selectively switching the primary electric motor 102 power output and regenerative braking states.

FIG. 4 illustrates a hybrid power unit 100 according to various embodiments of the disclosure. FIG. 4 illustrates a primary electric motor 102 connected to a motor output 112. The primary electric motor 102 can be coupled with a speed reduction mechanism such as a transmission element 110. The transmission element 110 can include a gearbox (e.g., a planetary gearbox). A plurality of transmission mounts 402 can couple the transmission element 110 with the mounting arm 116.

A cooling fan 404 can be coupled to the transmission element 110. The cooling fan 404 can be connected with an output element 406 (e.g., an engine output shaft) that connects to the internal-combustion engine 104. The speed of the cooling fan 404 can be proportional to the speed of rotation of the output element 406 of the internal-combustion engine 104. In FIG. 4, the cooling shroud 108 described above has been removed for improved visibility of the illustrated components.

In one implementation, the internal-combustion engine 104 includes a fuel-injected, air-cooled horizontally-opposed (or "flat"), two-cylinder, internal-combustion, gasoline engine mounted in the hybrid power unit 100 with the axis of its crankshaft in line with the rotational axis of the rotor 106 and primary electric motor 102. However, the internal-combustion engine 104 can include one or more combustion chambers (e.g., a single-cylinder or multi-cylinder internal-combustion engine with cylinders in any other format or arrangement) and configured to operate on any other type of liquid fuel (e.g., JP8, nitro methane, alcohol, etc.). Yet alternatively, the internal-combustion engine 104 can include a rotary, radial, turbine, or other type of internal-combustion engine. According to various embodiments, the internal-combustion engine 104 is coupled to the primary electric motor 102 and the rotor 106 via a disengagement mechanism 804 (as illustrated in FIG. 8A (such as a clutch).

Figure 5:
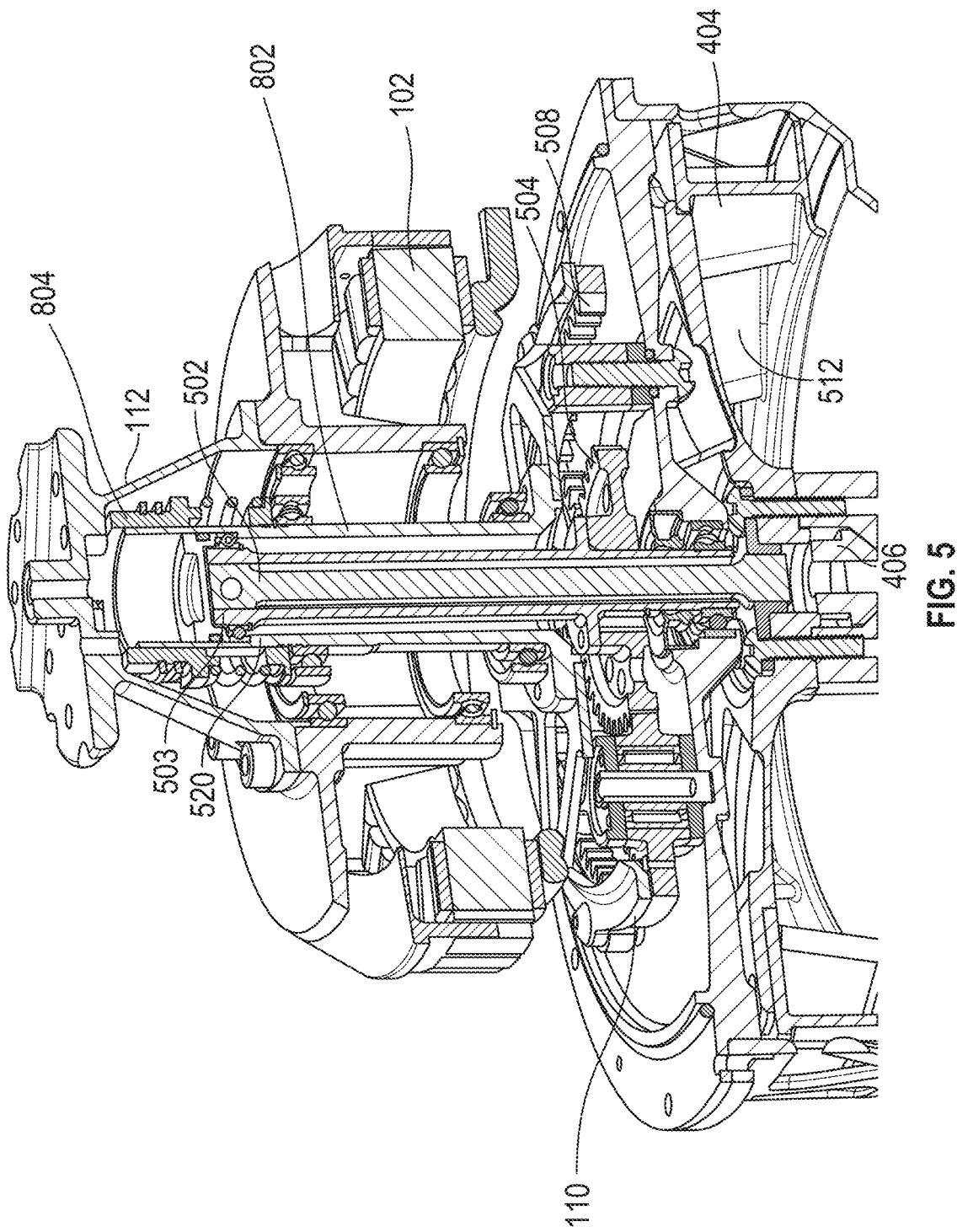
FIG. 5 illustrates a cut-away view of a hybrid power unit according to various embodiments of the disclosure.

FIG. 5 illustrates a cut-away view of a hybrid power unit including the primary electric motor 102 and a transmission element 110. The primary electric motor 102 can generate a torque on a motor output 112 through the use of one or more permanent magnets and electromagnets. The motor output 112 can be connected with the rotor 106. The primary electric motor 102 can include a disengagement mechanism 804, as shown in FIG. 8 and discussed further below, to enable the motor output 112 to be disengaged from the primary electric motor 102 under certain circumstances (e.g., a failure of the internal combustion engine 104).

The disengagement mechanism can enable the primary electric motor 102 to turn the output element 406 of the internal-combustion engine 104 when starting the internal-combustion engine 104. The output element 406 can be connected to a crankshaft of the internal-combustion engine 104.

The output element 406 of the internal combustion engine 104 can be connected to an inner coaxial shaft 502 that in turn is coupled to an outer coaxial shaft 503 collectively forming a torsion shaft 520. The torsion shaft 520 is coupled to a sun gear 504 of the planetary gearbox (discussed below in greater detail in connection with FIG. 7). In various embodiments, the torsion shaft 520 can be pinned to the sun gear 504. As the sun gear 504 rotates, it turns the various planet gears 506 which turn the outer ring gear 508. As the outer ring gear 508 turns, the torque turns the final output shaft 802 as shown in FIG. 8A.

FIG. 5 also illustrates one or more vanes 512 of a cooling fan 404. As the cooling fan 404 rotates, the one or more vanes 512 provide an airflow to cool various engine components.

FIG. 6 illustrates an underside view of a portion of a hybrid power unit according to various embodiments of the disclosure. The hybrid power unit can be connected to a mounting arm 116. FIG. 6 illustrates the cooling fan 404 mounted to a bottom of the transmission element 110, that remains under a coverage area of the mounting arm 116. FIG. 6 also illustrates various components of the internal-combustion engine 104 such as the exhaust 602, the cylinder head 604, and the air filter 606.

Figure 7:
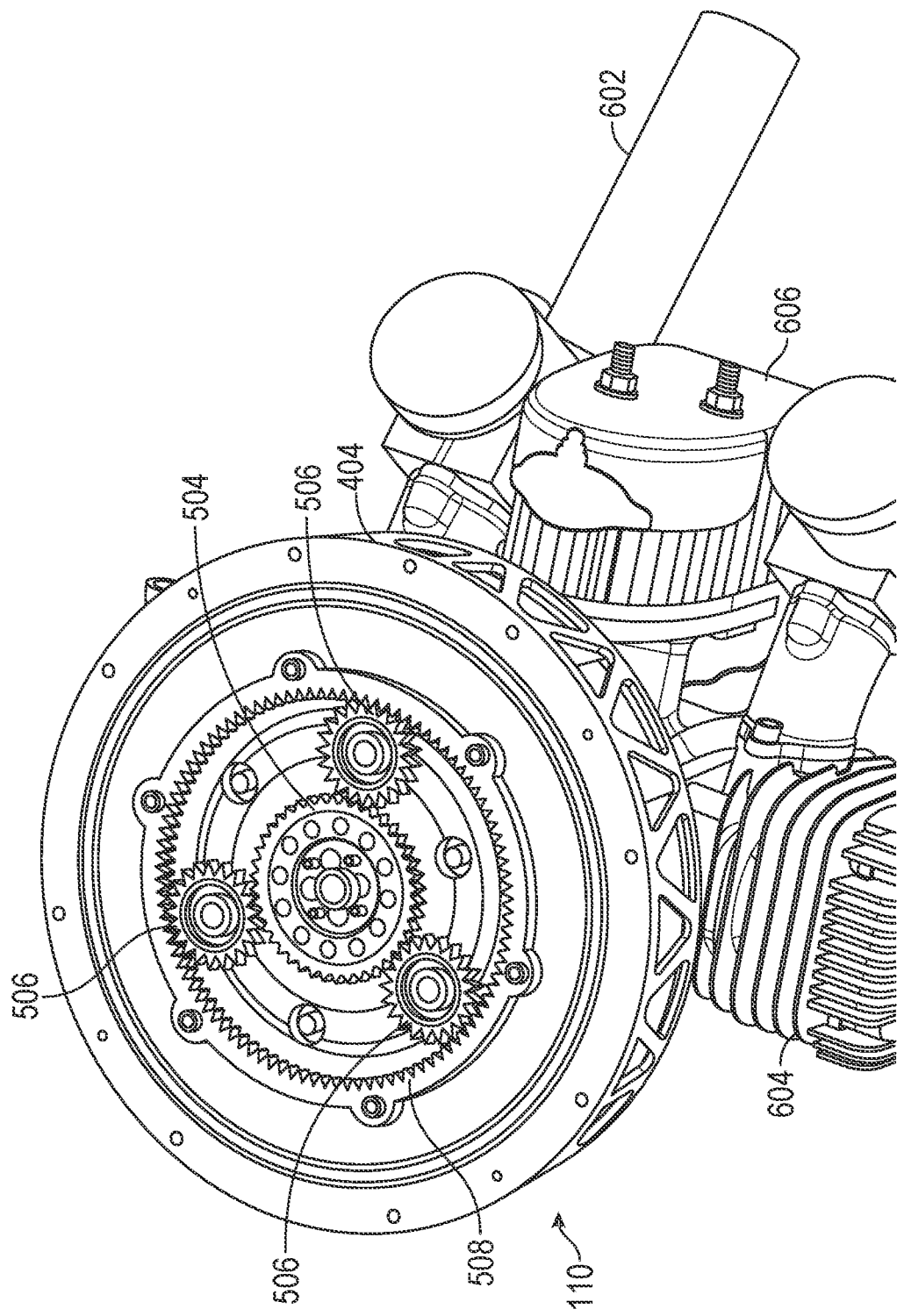
FIG. 7 illustrates a cut-away top-view of a hybrid power unit according to various embodiments of the disclosure.

FIG. 7 illustrates a cut-away top-view of the hybrid power unit including the planetary gear transmission element 110. The transmission element 110 can include a sun gear 504, multiple planetary gears 506, and an outer ring gear 508. The load from the sun gear 504 can be distributed to several planetary gears 506 which can either be used to drive the outer ring gear 508 or a shaft or spindle. The central sun gear 504 takes a high-speed, low-torque input. The sun gear 504 can drive several rotating external gears which increases the torque. The simple design can be a highly efficient and effective way of transferring power from a motor to an output.

The transmission element 110 can reduce the amplitude of torque pulses from the internal-combustion engine 104 to the rotor 106. The flywheel used as the cooling fan 404 is one component that reduces the torque pulses. The combination of shafts to form a torsion shaft 520 is a second component to reduce the torque pulses.

FIG. 8A illustrates a disengagement mechanism 804 in a closed or engaged state according to an embodiment of the disclosure. The disengagement mechanism 804 allows for selective engagement and disengagement of the final output shaft 802 from the motor output 112.

Figure 8B:
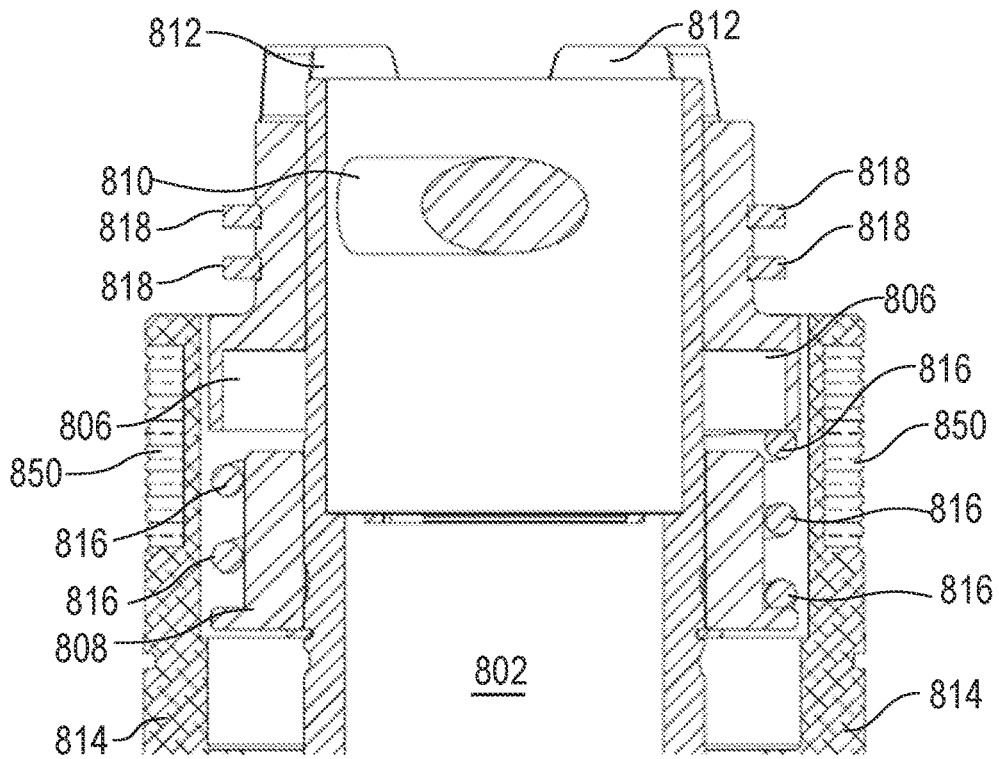
FIG. 8B provides another perspective view of an embodiment of a disengagement mechanism in a disengaged state.

As shown in FIGS. 8A and 8B, the disengagement mechanism (e.g., a clutch) is interposed between the internal-combustion engine 104 and the rotor 106 and is configured to selectively: couple (or "engage") the final output shaft 802 of the internal-combustion engine 104 to the rotor 106; and decouple (or "disengage") the final output shaft 802 of the internal-combustion engine 104 from the rotor 106.

For example, the disengagement mechanism 804 can include: a two-way dog clutch mounted to the final output shaft 802 of the internal-combustion engine 104. In this example, the hybrid power unit 100 can also include a clutch actuator (e.g., a solenoid 850) configured to selectively engage and disengage the clutch. In particular, the local controller can trigger the clutch actuator to engage the clutch to couple the torsion shaft 520 of the internal-combustion engine 104 to the rotor 106: when the primary electric motor 102 is actuated to start the internal-combustion engine 104 at the beginning of a flight; and during the flight when the internal-combustion engine 104 is operated to directly drive the rotor 106. In this example, the local controller can similarly trigger the clutch actuator to disengage the clutch to decouple the final output shaft 802 of the internal-combustion engine 104 from the rotor 106: responsive to an engine failure in order to reduce drag on the rotor 106 as the local controller and the electronic motor speed controller transition to driving the rotor 106 exclusively with the primary electric motor 102; and during takeoff and landing procedures in order to reduce rotating mass of the rotor 106, engine, and primary electric motor 102 assembly and thus to control commands received from the primary flight controller 180 during these higher-risk maneuvers.

The primary electric motor output shaft 814 is connected to the motor output 112 and provides torque to turn the rotor 106. A disengagement mechanism 804 can connect the final output shaft 802 that provides torque from the internal-combustion engine 104. A spring 816 can provide an upward force to couple the disengagement mechanism 804 with the motor output 112. The top surface of the disengagement mechanism 804 can include a plurality of dogs 812 that fit between a plurality of gaps in a surface of the motor output 112. The final output shaft 802 and the disengagement mechanism 804 can have a recess 810 through both sides of the surface of the final output shaft 802 and disengagement mechanism 804 (e.g., the recess 810 extending along an inner diameter of the final output shaft 802 and the disengagement mechanism 804). The recess 810 can be sized to receive a pin to couple the disengagement mechanism 804 with the final output shaft 802. The recess 810 can be elongated such that the pin can travel up and down in the recess 810 to maintain the disengagement mechanism 804 coupled with the final output shaft 802 when the disengagement mechanism 804 is coupled with the motor output 112 and when the disengagement mechanism 804 is uncoupled from the motor output 112. An exemplary pin placed in the recess 810 is shown and discussed below in connection with FIG. 9A.

FIG. 8B provides a perspective view of the disengagement mechanism 804 in the open or disconnected state. Under various conditions (e.g., a failure of the internal-combustion engine 104), it would be desirable to disengage the final output shaft 802 from the motor output 112. The disengagement mechanism 804 can include a permanently magnetized ring 806. A solenoid 850 can be affixed to a portion of the final output shaft 802. The solenoid 850 can include a magnetic coil that can be an electro-magnet. As electricity is passed through the solenoid 850 it can generate a magnetic field that can interact with the permanently magnetized ring 806. If the solenoid 850 is energized, an electromagnet can generate a magnetic field that will attract the permanently magnetized ring 806 causing the disengagement mechanism 804 to slide down toward the spring seat 808. This downward force will cause the dogs 812 to become disengaged from the motor output 112. When the permanently magnetized ring 806 couples to the spring seat 808, the disengagement mechanism 804 is kept in the opened configuration. Once the permanently magnetized ring 806 couples to the spring seat 808, the solenoid 850 does not have be kept energized to keep the disengagement mechanism 804 in the opened configuration. The default position of the disengagement mechanism 804 is in the closed (engaged) position. In some embodiments, a manual lever (not shown) can be used to disengage and re-engage the disengagement mechanism.

In various embodiments, if the polarity of the solenoid 850 is reversed, the electromagnet can generate a repulsive force causing the disengagement mechanism 804 to slide upwards around the final output shaft 802. The dogs 812 of the disengagement mechanism 804 can recouple with the recesses of the motor output 112. A plurality of retainer rings 818 can surround the disengagement mechanism 804 and can be used to retain the pin within the recess 810 in both the closed/opened configurations of the disengagement mechanism 804.

Dog Clutch and Emergency Clutch Disengagement

In one implementation shown in FIGS. 8A, 8B, and 9A, and 9B and described above, the disengagement mechanism 804 includes a two-way dog clutch configured to transfer torque between the internal-combustion engine 104 and primary electric motor 102. In this implementation, during a start cycle, the local controller 1302 can trigger the clutch actuator to engage the disengagement mechanism 804 (e.g. placing the disengagement mechanism 804 in a closed configuration) and then actuate the primary electric motor 102 to start the internal-combustion engine 104 before takeoff. In some embodiments, a default configuration of the disengagement mechanism 804 may be the closed configuration, and no additional steps may need to be taken. Alternatively, the local controller 1302 can trigger the clutch actuator to engage the disengagement mechanism 804 and then actuate the primary electric motor 102—with the internal-combustion engine 104 rotating but inactive—during a takeoff procedure; once the aerial vehicle reaches a minimum altitude (e.g., about 10 meters), the local controller 1302 can activate a spark or glow plug in the internal-combustion engine 104 and/or increase the throttle setpoint of the internal-combustion engine 104 in order to start the internal-combustion engine 104. Once the internal-combustion engine 104 is started and throughout subsequent missions executed by the aerial vehicle, the local controller 1302 can maintain the disengagement mechanism 804 in this "engaged" position, modulate the throttle setpoint of the internal-combustion engine 104, selectively transition the primary electric motor 102 between torque output and regenerative braking states, and modulate the torque output of the primary electric motor 102—in the torque output state—in order to control the thrust generated by the rotor 106 according to commands received from the primary flight controller 180.

Once the aerial vehicle completes this mission and a landing, the local controller 1302 can trigger the clutch actuator to disengage the disengagement mechanism 804, thereby placing the disengagement mechanism 803 in the opened configuration and separating the disengagement mechanism 804 for storage (e.g., to prevent corrosion and cohesion of the disengagement mechanism 804 due to long-term contact between the dogs 812 and dog receivers 144 in the disengagement mechanism 804) and/or to enable the internal-combustion engine 104 to be serviced separately from the primary electric motor 102. Alternatively, as the aerial vehicle prepares to land—such as once the aerial vehicle descends to a minimum altitude (e.g., 10 meters)—the local controller 1302 can: trigger the clutch actuator to disengage the disengagement mechanism 804; and deactivate the internal-combustion engine 104 (e.g., by deactivating a spark or a glow plug in the internal-combustion engine 104) while modulating the torque output of the primary electric motor 102—in the torque output state—in order to control the thrust generated by the rotor 106 according to commands received from the primary flight controller 180 as the aerial vehicle lands and without drag from the internal-combustion engine 104 which can be done for a silent landing.

Furthermore, in this implementation, in response to detecting a failure at the internal-combustion engine 104, the local controller 1302 can transition the motor into the torque output state. The local controller 1302 can trigger the clutch actuator to disengage the disengagement mechanism 804; and drive the primary electric motor 102 to increase torque output by the primary electric motor 102 to the rotor 106 (i.e., to compensate for loss of power transmission from the internal-combustion engine 104). For example, the controller can detect a failure at the internal-combustion engine 104 in response to: a rapid increase in power demand from the primary electric motor 102 to maintain a target speed of the rotor 106; and then no or minimal reduction in power demand from the primary electric motor 102 to maintain the target speed following (i.e., despite) large increases in the throttle setpoint of the internal-combustion engine 104. (In this example, after triggering disengagement of the disengagement mechanism 804, the local controller 1302 can also: power the primary electric motor 102—via the battery 194—to drive the rotor 106 to target rotor speeds received from the primary flight controller 180 for a backup power duration (e.g., up to five minutes) supported by the battery 194 at the target battery state of charge (e.g., between 70% and 80% of full battery 194 charge); generate a command or prompt to land the aerial vehicle within the backup power duration; and return this command to the primary flight controller 180, which can autonomously land the aerial vehicle according to the command or return the prompt to a human operator.)

Additionally or alternatively, in this implementation, to reengage the disengagement mechanism 804 with the internal-combustion engine 104 stopped while the aerial vehicle is in flight, the local controller 1302 can: stop the primary electric motor 102 while the primary flight controller 180 interfaces with other power units in the aerial vehicle to increase total thrust output; trigger the clutch actuator to engage the disengagement mechanism 804; and then actuate the primary electric motor 102 to start the internal-combustion engine 104. Similarly, in this implementation, to reengage the disengagement mechanism 804 with the internal-combustion engine 104 active while the aerial vehicle is in flight, the local controller 1302 can: drive the primary electric motor 102 and the internal-combustion engine 104 to an angular speed while the primary flight controller 180 interfaces with other power units in the aerial vehicle to maintain a total, balanced thrust output of the aerial vehicle; and then trigger the clutch actuator to engage the disengagement mechanism 804.

Timed Clutch Engagement/Disengagement

In one variation, the local controller 1302 can track angular positions of the internal-combustion engine 104, final output shaft 802, as shown in FIG. 8A, and the disengagement mechanism 804 and times of engagement of the disengagement mechanism 804 by the clutch actuator 850 in order to align the dogs 812 of the disengagement mechanism 804 to their corresponding dog receivers in order to enable in-flight re-engagement of the disengagement mechanism 804 when the input and output sides of the disengagement mechanism 804 (e.g., the internal-combustion engine 104 final output shaft 802.

In this variation, the hybrid power unit 100 can include: a first angular position sensor coupled to the internal-combustion engine 104 final output shaft 802; and a second angular position sensor coupled to the output side of the disengagement mechanism 804 (or to the primary electric motor 102, the rotor 106). During normal flight operations, the local controller 1302 can trigger the clutch actuator to disengage the disengagement mechanism 804 and then deactivate the internal-combustion engine 104. This can occur when the current state of charge of the battery 194 in the aerial vehicle exceeds the target state of charge (e.g., in order to reduce rotating resistance of the rotor 106 as the primary electric motor 102—powered by the battery 194—drives the rotor 106 to a target rotor speed). This can also occur when noise generated by the aerial vehicle exceeds a local noise limit. As the battery state of charge drops below the target battery state of charge, the local controller 1302 can detect the current position of the internal-combustion engine 104 final output shaft 802 via the first angular position sensor. The local controller 1302 can also track the current position and angular speed of the output side of the disengagement mechanism 804 via the second angular position sensor. The local controller can retrieve a clutch engagement time (e.g., from local memory) representing a nominal (e.g., average) duration of time for the clutch actuator to transition the disengagement mechanism 804 from the current disengaged position to a minimum engagement position. The local controller can calculate an angular distance traversed by the disengagement mechanism 804 output relative to the internal-combustion engine 104 final output shaft 802 over the disengagement mechanism 804 engagement time based on the current angular speed of the disengagement mechanism 804 output. The local controller 1302 can retrieve an angular offset (e.g., 0°, 90°, 180° or 270° for a four-dog clutch) between the final output shaft 802 and the disengagement mechanism 804 output in which the dogs 812 of the disengagement mechanism 804 align with corresponding receivers in the disengagement mechanism 804; and calculate an angular clutch actuator trigger position by subtracting the angular distance from the angular offset. The local controller 1302 can also correct the angular clutch actuator trigger position by a stored calibration value tuned for the particular clutch and clutch actuator. The local controller 1302 can then trigger the clutch actuator to engage the disengagement mechanism 804 when the disengagement mechanism 804 output reaches the angular clutch actuator trigger position, thereby enabling the dogs 812 to align with the receivers in the disengagement mechanism 804 as the disengagement mechanism 804 engages and reducing or eliminating bounce and slippage within the disengagement mechanism 804 during engagement.

An additional variation of the disengagement mechanism engagement that does not require any additional sensors is to rotate the motor slowly and then shut it off allowing it to "coast" while reading the speed. Once the speed has dropped below a certain threshold the disengagement mechanism can be engaged with good reliability and minimal wear on the system.

In one implementation in which the aerial vehicle includes multiple (e.g., four) power units, the local controller 1302 can also reduce the throttle and increase the voltage across the primary electric motor 102 in order to reduce an angular speed difference (or "mismatch") between the internal-combustion engine 104 final output shaft 802 and the disengagement mechanism 804 output, thereby reducing impact and wear between the dogs 812 and dog receivers in the disengagement mechanism 804. In this implementation, the primary flight controller 180 and local controllers 1302 in the other power units can compensate for the reduction in output thrust of this power unit by similarly reducing the speed of a rotor 106 in a second, opposing power unit and increasing speeds of the rotors 106 in the remaining (e.g., third and fourth) power units in the aerial vehicle.

Thus, in this variation, the local controller 1302 can time actuation of the clutch actuator based on performance of the clutch actuator, the geometry of the disengagement mechanism 804, and the speed of the internal-combustion engine 104 final output shaft 802 and the disengagement mechanism 804 output in order to selectively re-engage the disengagement mechanism 804 during operation, such as after stopping the internal-combustion engine 104 during flight.

In one variation, the disengagement mechanism 804 can open while the internal-combustion engine 104 is running, the internal-combustion engine 104 can be brought to idle so that it is quiet and uses very little fuel, the primary electric motor 102 can then continue flying the aircraft, when it is time to re-engage, the engine throttle can be increased to roughly match the rotor speed, then the electronic control unit can engage the disengagement mechanism 804 to re-engage.

In other variations, the internal-combustion engine 104 includes a gas turbine or other type of internal-combustion engine and is coupled to the primary electric motor 102 and to the rotor 106 via a geared transmission element 110, a bevel-drive, a constant-velocity transmission, or other power transmission subsystem.

Figure 9A:
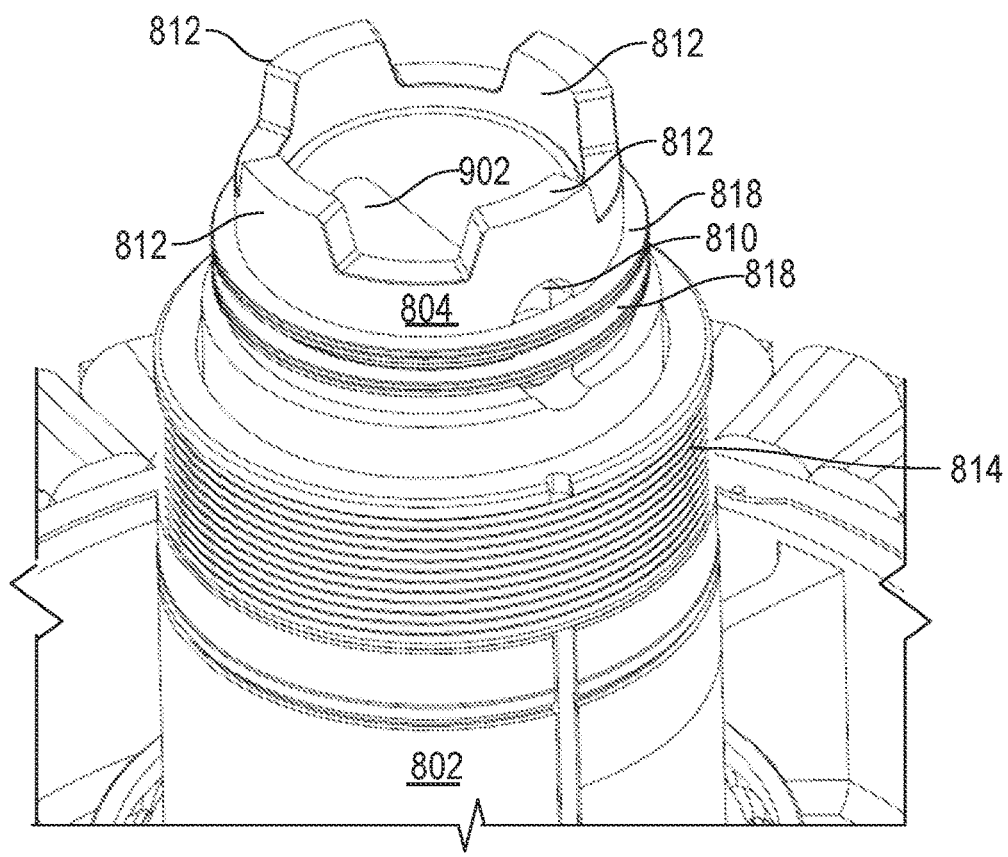
FIG. 9A provides another perspective view of one embodiment of the disengagement mechanism with the plurality of dogs.

FIG. 9A provides another perspective view of the disengagement mechanism 804 with the plurality of dogs 812. As shown, in FIG. 9A the dogs 812 are angled with respect to a top surface of the disengagement mechanism in order to reduce friction between faces of the disengagement mechanism and the dog receivers of the primary electric motor to allow for disconnection under load. In various embodiments, the angle can be an acute angle. In various embodiments, the angle can be a range between 3 and 30 degrees.

FIG. 9A illustrates a pin 902 in the recess 810. The pin 902 couples the disengagement mechanism 804 with the final output shaft 802. The recess 810 has an elongated shape such that the pin 902 can travel up and down in the recess 810 to maintain the disengagement mechanism 804 coupled with the final output shaft 802 at all times. The plurality of retainer rings 818 surround the disengagement mechanism 804 and retain the pin 902 within the recess 810 in both the closed/opened configurations of the disengagement mechanism 804.

Figure 9B:
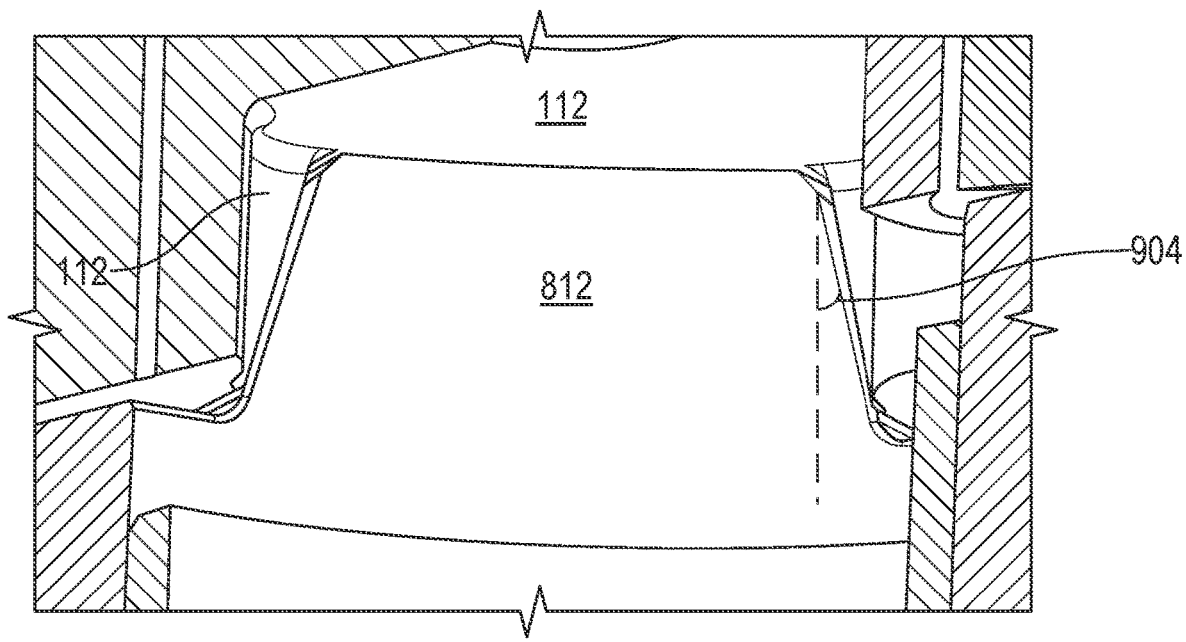
FIG. 9B illustrates a close-up view of the engagement between a dog of the engagement mechanism and the surface of a motor output.

FIG. 9B illustrates a close-up view of the engagement between a dog 812 of the disengagement mechanism 804 and the surface of the motor output 112. As shown, in FIG. 9B the dogs 812 are angled with respect to a top surface of the disengagement mechanism in order so that the transmitted torque creates force action to push the disengagement mechanism 804 down. This force aids the solenoid 850 in causing the disengagement mechanism 804 to disengage. FIG. 9B illustrates an angle 904 between a notional vertical line for a perpendicular edge for the dogs 812 and an actual angled surface of the dogs 812. In various embodiments, the angle can be a range between 3 and 30 degrees.

FIG. 10 illustrates an arm 116 that retains the hybrid power unit 100 via a Dynafocal mount 1002. A Dynafocal mount 1002 can be designed to minimize the engine vibration that gets transferred to the rest of the unmanned aerial system. The structure of the Dynafocal mount 1002 can be built in a ring shape, increasing the strength of the structure but limiting the access for installation and repairs. In some embodiments, the Dynafocal mount 1002 can be installed such that the mounting points are angled. For example, the mounting points may be placed at a given angle that if lines were drawn through each of the mounting point, the lines would intersect at a point directly above the center of thrust of the aerial vehicle.

Figure 11:
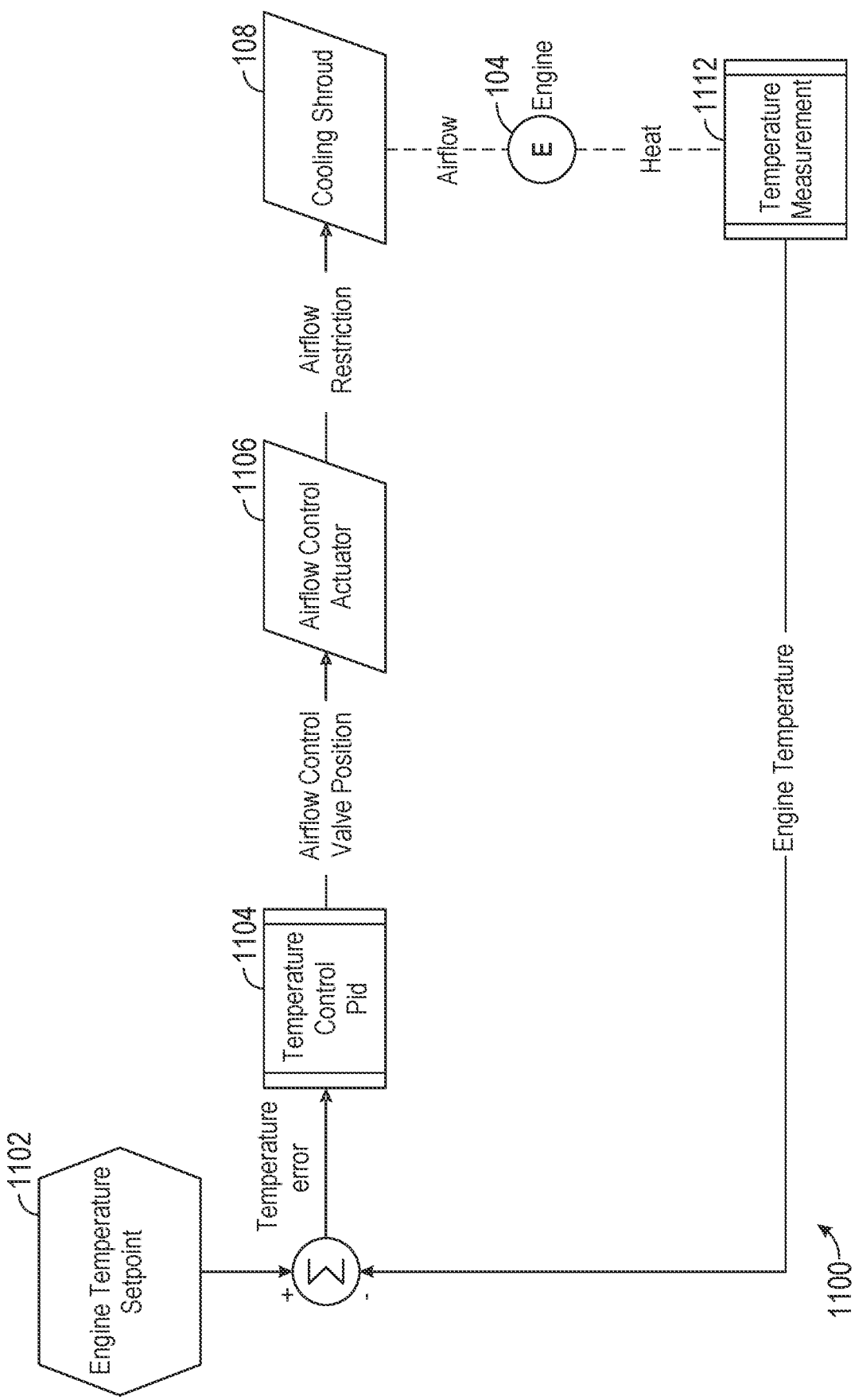
FIG. 11 illustrates a flowchart for an engine cooling/supplemental thrust system.

FIG. 11 illustrates a flowchart 1100 for an engine cooling/supplemental thrust system. The engine cooling/supplemental thrust system uses airflow drawn by a cooling fan 404, as shown in FIG. 4, attached to a shaft of the internal-combustion engine 104 through an cooling shroud intake 408, as shown in FIG. 4, through the cooling shroud 108 over the exterior of the internal-combustion engine 104 and out through an cooling shroud exhaust 114. The cooling shroud exhaust 114 can be aligned in the direction of the thrust produced by the rotor 106. The cooling shroud intake 408 can include an airflow control to vary the airflow through the cooling shroud intake 408. The cooling shroud intake 408 can be from the bottom of the internal-combustion engine 104.

According to various embodiments, a local controller 1302 can establish an engine temperature setpoint 1102. A proportional-integral-derivative (PID) controller 1104 can receive an engine temperature measurement 1112 from a temperature sensor within an internal-combustion engine compartment. The engine temperature measurement 1112 can be sent to the PID controller 1104 via wired or wireless means. The PID controller 1104 can use closed-loop control feedback to keep the actual output from a process as close to the target or setpoint output as possible.

The PID controller 1104 can vary the position of an airflow control actuator 1106. For example, if the engine temperature measurement 1112 is above the engine temperature setpoint 1102, the controller 1104 can send a signal to the airflow control actuator 1106 to increase airflow through into the cooling shroud 108 and over the internal-combustion engine 104. The airflow control actuator 1106 can adjust the opening of the cooling shroud intake to vary the airflow into the cooling shroud 1108. As the engine temperature measurement 1112 decreases below the engine temperature setpoint 1102, the controller 1104 can send a signal to the airflow control actuator 1106 to reduce the airflow through the cooling shroud 1108.

In various embodiments, the position of the cooling shroud intake as controlled by the airflow control actuator 1106 can be used to determine the supplement thrust provided by the cooling airflow that flows through the cooling shroud exhaust.

In various implementations, the local controller 1302 also implements closed-loop controls to vary the airflow via an adjustable intake as a function of (e.g., proportional to) the temperature of the internal-combustion engine 104. For example, if the current temperature of the internal-combustion engine 104 exceeds the target operating temperature of the internal-combustion engine 104, the local controller 1302 can increase the opening of the air intake to increase the airflow over the internal-combustion engine 104; and vice versa. Furthermore, the local controller 1302 can feed a total throttle setpoint delta for the current command cycle forward into the closed-loop control of airflow control actuator 1106 in order to preemptively adjust airflow through the cooling shroud 108 as a function of (e.g., proportional) an anticipated future change in the temperature of the internal-combustion engine 104 following implementation of this total throttle setpoint delta for the current command cycle. For example, the local controller 1302 can reduce the intake valve—and thus reduce airflow over the internal-combustion engine 104—if the total throttle setpoint delta is negative for the current command cycle; and vice versa.

Generally, because the cooling shroud outlet 114 of the cooling shroud 108 is parallel to the axis of rotation of the rotor 106, air flowing through the cooling shroud 108 may impart additional thrust parallel and complementary to thrust produced by the rotor 106, as shown in FIG. 1. In one example: the motor and the internal-combustion engine 104 are arranged below the rotor 106; the shroud inlet 408 can be interposed between the cylinder head 604 and the rotor 106; and the cooling shroud outlet 114 is arranged below the cylinder head and faces opposite the rotor 106 to direct air—drawn through the shroud inlet 408 between the cylinder head 604 and the rotor 106—downward to produce a secondary thrust, such as approximately parallel to the primary thrust generated by the rotor 106 above.

Furthermore, in response to a rotor speed command specifying a new target rotor speed in excess of the current rotor speed, the local controller 1302 can automatically increase the airflow through the cooling shroud 108 in order to rapidly increase total thrust output of the hybrid power unit 100 as the electronic motor speed controller drives the primary electric motor 102 to this new target rotor speed. For example, the new target rotor speed received from the primary flight controller 180 may represent a command for increased total thrust output by the hybrid power unit 100. To achieve a rapid change in the total thrust output of the hybrid power unit 100 on very short timescales (e.g., milliseconds or tens of milliseconds), the local controller 1302 can automatically increase the opening of the shroud intake (e.g., to its maximum opening) in order to rapidly increase thrust output from the cooling shroud 108 (e.g., within tens of milliseconds) as the electronic motor speed controller increases the speed of the primary electric motor 102 to its new target rotor speed (e.g., within hundreds of milliseconds). Over subsequent command cycles, the local controller 1302 can reduce the opening of the shroud intake—such as back to a position proportional (e.g., "matched") to the temperature of the internal-combustion engine 104—as the speed of the primary electric motor 102 and the rotor 106 approaches the last target rotor speed and/or as the thrust generated by the rotor 106 approaches a total target thrust represented by this target rotor speed.

In this variation, the local controller 1302 can receive commands specifying target total thrusts from the primary flight controller 180. The local controller 1302 can then implement methods and techniques described below to calculate rotor and cooling fan speeds to achieve these target total thrusts. For example, the local controller 1302 can store a local copy of a parametric model or lookup table; to calculate a target rotor speed, the local controller 1302 can insert a target total thrust, a current cooling fan speed, a current altitude of the aerial vehicle, a humidity, and/or a barometric pressure into the parametric model or lookup table, which returns a target rotor speed.

Alternatively, the local controller 1302 can receive rotor speed commands—specifying uncorrected rotor speeds—from the primary flight controller 180. The local controller 1302 can then calculate a target total thrust based on the uncorrected rotor speed and calculate a target rotor speed (e.g., based on the current cooling fan speed, the current altitude of the aerial vehicle, the local humidity, and/or the local barometric pressure) based on this target total thrust, such as described above.

However, the local controller 1302 can implement any other method or technique to calculate total or partial thrust outputs of the rotor 106 and cooling fan 404 and/or to calculate target speeds of the rotor 106 and the cooling fan 140 based on a command received from the primary flight controller 180.

During operation, the local controller 1302 can: read a temperature of the internal-combustion engine 104 from a temperature sensor coupled to the internal-combustion engine 104; calculate an airflow actuator position proportional to the temperature of the internal-combustion engine 104; and drive the cooling fan 404 to a cooling fan speed at a speed proportional to the speed of the internal-combustion engine 104.

The local controller 1302 can also estimate the secondary thrust—output from the cooling shroud outlet 114—based on the cooling fan speed of the cooling fan 404 and the airflow actuator position. For example, the local controller 1302 can pass the current cooling fan speed, the current altitude of the aerial vehicle, the local humidity, and/or the local barometric pressure into the cooling fan 404 model, which returns a secondary thrust estimate based on these values. Furthermore, the local controller 1302 can calculate vertical and horizontal (or pitch, yaw, roll) thrust components of the secondary thrust based on a known angular offset between the cooling shroud outlet 114 and the rotor 106.

Similarly, the local controller 1302 can estimate the primary thrust—output by the rotor 106—based on the rotor speed. For example, the local controller 1302 can pass the current rotor speed, the current altitude of the aerial vehicle, the local humidity, and/or the local barometric pressure into the rotor model, which returns a primary thrust estimate based on these values.

In one variation, the hybrid power unit 100 further includes an adjustable nozzle, and the local controller 1302 implements thrust-vectoring techniques to adjust the orientation of the adjustable nozzle to direct secondary thrust output from the cooling shroud outlet 114 in different orientations (e.g., along different pitch, roll and/or yaw directions) relative to the rotor 106. Thrust vectoring, also known as thrust vector control (TVC), is the ability of an aircraft or unmanned aerial system to manipulate the direction of the thrust from its engine(s) or motor(s) to control the attitude or angular velocity of the vehicle. Here, thrust-vectoring can use the cooling air to augment the thrust of the main rotor. By having a directional air outlet 114, the aerial vehicle can perform thrust-vectoring.

In one example: the internal-combustion engine 104 can be arranged below the rotor 106; the shroud inlet 408 can be interposed between the cylinder head 604 and the rotor 106; the cooling shroud outlet 114 can be arranged below the cylinder head 604 and faces opposite the rotor 106; and the hybrid power unit 100 further includes a nozzle coupled to cooling shroud outlet 114 and a nozzle actuator configured to drive the nozzle over a range of (pitch, roll and/or yaw) orientations. In this implementation, the local controller 1302 can drive the nozzle actuator to locate the nozzle in a nominal orientation to output the secondary thrust approximately parallel to the primary thrust generated by the rotor 106—that is, a "0°" orientation that locates the axis of the nozzle parallel to the rotational axis of the rotor 106. Then, in response to receiving, from the primary flight controller 180, a command that indicates a target total thrust that includes a yaw thrust component, the local controller 1302 can: drive the nozzle actuator to locate the nozzle in a yaw orientation (e.g., a 30° yaw orientation, a 90° yaw orientation; and drive the cooling fan 404.

In this example, the local controller 1302 can concurrently: calculate a target rotor speed of the rotor 106 based on the target total thrust specified in the command and a component of the secondary thrust output from the nozzle parallel to the primary thrust generated by the rotor 106; adjust the throttle setpoint of the internal-combustion engine 104 according to this new target rotor speed; and drive the primary electric motor 102 to selectively output torque to the rotor 106 and regeneratively brake the rotor 106 according to this new target rotor speed, as described above.

Alternatively, a first instance of the hybrid power unit 100 can include a fixed nozzle arranged at a preset angle (e.g., a positive yaw orientation) and paired with a second instance of the hybrid power unit 100 with a fixed nozzle arranged in a complementary angle (e.g., a negative yaw orientation). During operation, the primary flight controller 180 can: command these instances of the hybrid power unit 100 to rotate their rotors at similar speeds to achieve a null yaw rate; command the first instance of the hybrid power unit 100 to rotate its rotor faster than the second instance to achieve a positive yaw rate; and command the second instance of the hybrid power unit 100 to rotate its rotor faster than the first instance to achieve a negative yaw rate.

Generally, for the implementation described above in which the hybrid power unit 100 controls total thrust output based on the angular speed of the rotor 106, the local controller 1302 can execute: high-frequency, short-time-domain rotor speed adjustments—and therefore high-frequency, short-time-domain changes in total thrust output—by selectively braking and driving the primary electric motor 102; and low-frequency, long-time-domain changes in rotor speed by modulating the throttle setpoint of the internal-combustion engine 104.

In one implementation, upon receiving a target rotor speed from the primary flight controller 180, the local controller 1302 reads a current rotor speed of the rotor 106. In response to the current rotor speed exceeding the target rotor speed, the local controller 1302: drives the primary electric motor 102 in a braking configuration (e.g., in a regenerative braking state) to slow the rotor 106 to the target rotor speed over a first time interval (e.g., 100 microseconds per rotation per minute change in angular speed of the rotor 106); and reduces the throttle setpoint of the internal-combustion engine 104 to reduce torque output of the internal-combustion engine 104 over a second time interval (e.g., two seconds) longer than the first time interval. Similarly, in response to the target rotor speed exceeding the current rotor speed, the local controller 1302 can: drive the primary electric motor 102—in a torque output configuration—to advance the rotor 106 to the target rotor speed over a third time interval (e.g., 100 microseconds per rotation per minute change in angular speed of the rotor 106); and increase the throttle setpoint of the internal-combustion engine 104 to increase torque output of the internal-combustion engine 104 over a fourth time interval (e.g., two seconds) longer than the third time interval.

In this example, the local controller 1302 can also read a current battery state of charge of a battery 194 arranged in the aerial vehicle. Once the current rotor speed approximates the target rotor speed, the local controller 1302 can: increase the throttle setpoint of the internal-combustion engine 104 to increase torque output of the internal-combustion engine 104; and drive the primary electric motor 102 to regeneratively brake the rotor 106, recharge the battery 194, and maintain rotation of the rotor 106 at the target rotor speed if the current battery state of charge falls below a target battery state of charge. Similarly, once the current rotor speed approximates the target rotor speed, the local controller 1302 can: decrease the throttle setpoint of the internal-combustion engine 104 to decrease torque output of the internal-combustion engine 104; and drive the primary electric motor 102 with energy from the battery 194 to output torque to the rotor 106 and maintain rotation of the rotor 106 at the target rotor speed if current battery state of charge exceeds the target battery state of charge.

In this similar implementation in which the hybrid power unit 100 controls total thrust output based on both the speed of the rotor 106 and the speed of the cooling fan 404, the local controller 1302 can execute: small-amplitude, high-frequency, very-short-time-domain adjustments (or "corrections") to total thrust output of the hybrid power unit 100 by high-amplitude, moderate-frequency, moderate-time-domain adjustments to total thrust output of the hybrid power unit 100 by selectively braking and driving the primary electric motor 102; and high-amplitude, low-frequency, long-time-domain adjustments to total thrust output of the hybrid power unit 100 by adjusting the throttle setpoint of the internal-combustion engine 104.

In this example, the hybrid power unit 100 can achieve approximately a 250-Newton increase in the primary thrust generated by the rotor 106 within 500 milliseconds by increasing the speed of the primary electric motor 102 from 50% to 100% of its maximum speed. However, the battery 194 in the aerial vehicle may be sized to power a single primary electric motor 102 at 100% of its maximum speed (or to power the rotor 106 to 25% of the total weight of the aerial vehicle) for a limited duration (e.g., up to five minutes).

Furthermore, in this example, the hybrid power unit 100 can achieve up to a 250-Newton increase in the primary thrust generated by the rotor 106 within 2000 milliseconds by increasing the throttle setpoint of the internal-combustion engine 104 from 50% to 100%, and the aerial vehicle can carry sufficient fuel onboard to power a single internal-combustion engine 104 at 100% throttle (and under load) for a much longer duration (e.g., 90 minutes).

Therefore, the local controller 1302 can: modulate braking and torque output of the primary electric motor 102 over short time intervals (e.g., 500 milliseconds) and over short durations of time (e.g., less than 30 seconds) to achieve large, fast changes in total thrust output of the hybrid power unit 100; and modulate the throttle setpoint of the internal-combustion engine 104 over longer time intervals (e.g., two seconds) and over long durations of time (e.g., minutes or hours) to maintain large, consistent total thrust outputs of the hybrid power unit 100.

In another example, after receiving or calculating a target rotor speed based on a command received from the primary flight controller 180, the local controller 1302 can read a current rotor speed of the rotor 106 and a current battery state of charge of the battery 194 in the aerial vehicle. Then, in response to the target rotor speed exceeding the current rotor speed, the local controller 1302 can: drive the primary electric motor 102 to advance the rotor 106 to the target rotor speed over a second time interval longer than the first time interval; and increase the throttle setpoint to increase torque output of the internal-combustion engine 104 over a third time interval longer than the second time interval. Furthermore, once the current rotor speed reaches (e.g., falls within 1% of) the target rotor speed, the local controller 1302 can: increase the throttle setpoint to increase torque output of the internal-combustion engine 104; and drive the primary electric motor 102 to regeneratively brake the rotor 106, recharge the battery 194, and maintain rotation of the rotor 106 at the target rotor speed in response to the target battery state of charge exceeding the current battery state of charge. Conversely, in response to the current battery state of charge exceeding a target battery state of charge, the local controller 1302 can: decrease the throttle setpoint to decrease torque output of the internal-combustion engine 104; and drive the primary electric motor 102 with energy from the battery 194 to selectively output torque to the rotor 106 and maintain rotation of the rotor 106 at the target rotor speed.

In one variation described above, the rotor 106 includes a variable-pitch propeller. In this variation, the local controller 1302 can receive a thrust command specifying a target total thrust from the primary flight controller 180 and can estimate an instantaneous thrust generated by the rotor 106, such as: by querying a lookup table for a thrust value based on the current blade pitch, the current rotor speed, and the current altitude of the aerial vehicle; or by implementing a parametric thrust model to transform the current blade pitch, the current rotor speed, and the current altitude of the aerial vehicle into a current thrust value. The local controller 1302 can then: calculate a difference between the target total thrust and the actual thrust generated by the rotor 106; and calculate a blade pitch delta proportional to this difference. For example, if this difference is positive, the local controller 1302 can calculate a positive blade pitch delta, which may increase thrust output of the rotor 106 given a constant rotor speed; conversely, if this difference is negative, the local controller 1302 can calculate a negative blade pitch delta, which may decrease thrust output of the rotor 106 given a constant rotor speed. The local controller 1302 and then output a command to a blade actuator—coupled to a blade pitch control on the rotor 106—to adjust blades of the rotor 106 according to this blade pitch delta.

Concurrently, the local controller 1302 can output a command to the electronic motor speed controller to maintain the current rotor speed. For example, if the blade pitch delta is positive, the rotor 106 may require more torque to maintain its current speed. Therefore, the electronic motor speed controller can increase a voltage applied to the primary electric motor 102 in order to increase torque output of the primary electric motor 102 (i.e., on a shorter timescale than torque increases output by the internal-combustion engine 104). Conversely, if the blade pitch delta is negative, the rotor 106 may require less torque to maintain the current speed. Therefore, the electronic motor speed controller can regeneratively brake the primary electric motor 102 in order to rapidly reduce the speed of the rotor 106 (i.e., on a shorter timescale than friction-based speed losses).

Furthermore, during this command cycle, the local controller 1302 can: estimate the current torque output of the internal-combustion engine 104; calculate a positive efficiency-based throttle setpoint delta if the current torque output of the internal-combustion engine 104 is less than a target torque corresponding to a peak efficiency of the internal-combustion engine 104 at or near the current engine speed; and calculate a negative efficiency-based throttle setpoint delta if the current torque output of the internal-combustion engine 104 is more than this target torque. The local controller 1302 can then: retrieve a current battery state of charge; calculate a positive charge-based throttle setpoint delta if the current state of charge is less than a target state of charge; and calculate a negative charge-based throttle setpoint delta if the current state of charge is more than the target state of charge. The local controller 1302 can then implement methods and techniques described above to merge these throttle setpoint deltas into a new throttle setpoint for the internal-combustion engine 104 and to drive the throttle actuator to this new throttle setpoint during the current command cycle.

Given small or null changes in target total thrust specified by the primary flight controller 180 over subsequent command cycles, the local controller 1302 can: estimate the current thrust output of the rotor 106; calculate a blade pitch delta that returns the blade pitch of the rotor 106 back to a center (or "nominal") position that enables both large increases and large decreases in blade pitch—and therefore enables increases and decreases in thrust output of the rotor 106 over short timescales—responsive to a next thrust command; calculate a new rotor speed that maintains the current thrust output of the rotor 106 when this blade pitch delta is applied to the rotor 106 (e.g., based on the lookup table or parametric thrust model described above); output a command to the blade actuator to adjust the pitch of the rotor 106 blades according to this blade pitch delta; output a command to the electronic motor speed controller to drive the primary electric motor 102 to this new rotor speed; and implement methods and techniques described above to adjust the throttle setpoint of the internal-combustion engine 104 to maintain the internal-combustion engine 104 near a peak operating efficiency for this rotor speed and to maintain the state of charge of the battery 194. In particular, the local controller 1302 can execute closed-loop controls to implement this process to adjust the blade pitch delta back to a nominal position—while maintaining the charge state of the battery 194, the efficiency of the internal-combustion engine 104, and the temperature of the internal-combustion engine 104 within narrow target ranges—over multiple seconds and/or over multiple command cycles.

In one implementation of the hybrid power unit 100 that includes a variable-pitch rotor and a blade actuator, the local controller 1302 implements methods and techniques described above to: receive or calculate a target total thrust based on a command received from the primary flight controller 180; monitor a temperature of the internal-combustion engine 104; set a speed of the cooling fan 404 based on (e.g., proportional to) the internal-combustion engine 104 temperature; estimate the secondary thrust output by the cooling fan 404 and the cooling shroud 108 based on this cooling fan speed; monitor the current speed of the rotor 106; and calculate a target primary thrust—generated by the rotor 106—based on a difference between the target total thrust and the secondary thrust.

In this implementation, the local controller 1302 can also store a rotor thrust map that associates speed and pitch of the rotor 106 with thrust generated by the rotor 106. For example, the rotor thrust map can include: a set of pitch versus speed curves, including one curve for each rotor thrust or rotor thrust range; or a 3D surface representing combinations of rotor pitch, rotor speed, and thrust output values. The local controller 1302 can therefore select or extract a pitch versus speed curve—from the thrust map—that represents combinations of rotor pitch and speed values predicted to yield the target primary thrust.

The local controller 1302 can then: select a target rotor speed matched to the current pitch of the rotor 106 in this pitch versus speed curve; implement methods and techniques described above to selectively drive or brake the primary electric motor 102 to this target rotor speed over a short time interval (e.g., 500 milliseconds); and adjust the throttle setpoint of the internal-combustion engine 104 to reduce power output or braking load on the primary electric motor 102 while maintaining this target rotor speed over a longer time interval. The local controller 1302 can also implement methods and techniques described above: to estimate a target torque output of the internal-combustion engine 104 that corresponds to a target (e.g., maximum) engine efficiency at this target rotor speed; to estimate the current torque output of the internal-combustion engine 104; and to track the state of charge of the battery 194.

Then, if the current torque output of the internal-combustion engine 104 is less than the target engine torque and the battery state of charge is low (e.g., near or below the target battery state of charge), the local controller 1302 can: increase the throttle setpoint of the internal-combustion engine 104; and reduce the power output of the primary electric motor 102 or transition the primary electric motor 102 into the regenerative braking state to recharge the battery 194.

Alternatively, if the current torque output of the internal-combustion engine 104 is less than the target engine torque and the battery state of charge is high (e.g., near or above the target battery state of charge), the local controller 1302 can: reduce the target rotor speed; trigger the blade actuator to increase the rotor pitch (e.g., by a pitch step change of 0.5°); reduce the throttle setpoint of the internal-combustion engine 104; and increase the power output of the primary electric motor 102 (or reduce regenerative braking of the primary electric motor 102).

Yet alternatively, if the current torque output of the internal-combustion engine 104 is greater than the target engine torque and the battery state of charge is high (e.g., near or above the target battery state of charge), the local controller 1302 can: decrease the throttle setpoint of the internal-combustion engine 104; and increase the power output of the primary electric motor 102 (or reduce regenerative braking of the primary electric motor 102).

Furthermore, if the current torque output of the internal-combustion engine 104 is greater than the target engine torque and the battery state of charge is low (e.g., near or below the target battery state of charge), the local controller 1302 can: increase the target rotor speed; trigger the blade actuator to decrease the rotor pitch; increase the throttle setpoint of the internal-combustion engine 104; and decrease the power output of the primary electric motor 102 (or increase regenerative braking of the primary electric motor 102).

The local controller 1302 can repeat this process throughout operation, such as at a rate of 1000 Hz while in flight.

Figure 12:
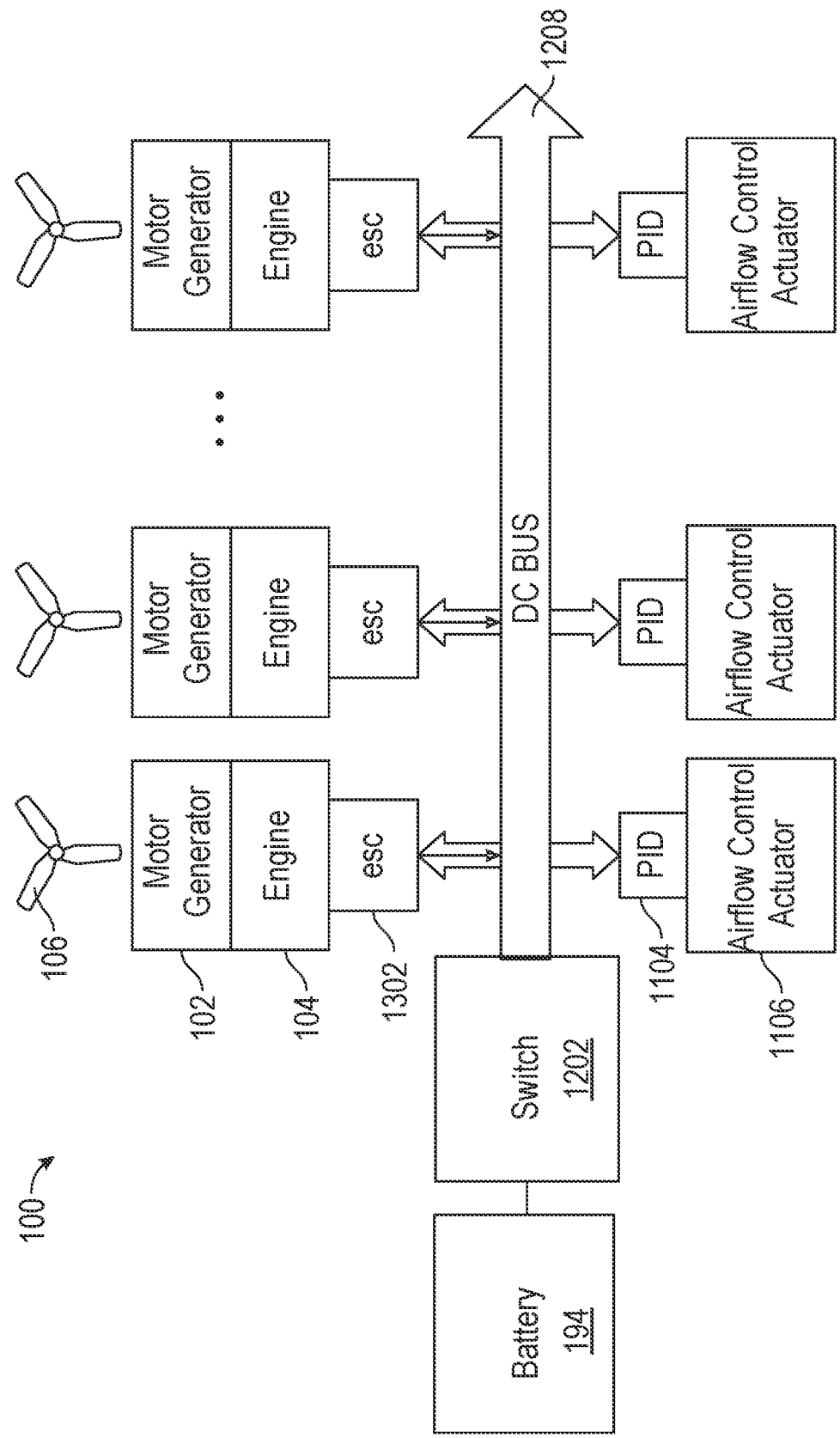
FIG. 12 illustrates a simplified block diagram of a system of hybrid power units incorporated in an unmanned aerial system.

FIG. 12 illustrates a simplified block diagram of an unmanned aerial system having multiple hybrid power units 100. The system can include a plurality of rotors 106. The rotors 106 can be driven by a plurality primary electric motor(s) 102 and a plurality of internal-combustion engines 104. The speed of the rotors 106 can be controlled by an electronic speed controller 1302.

The electrical power for the plurality of primary electric motor(s) 102 can be received from a battery 194. The battery 194 can be a rechargeable battery and can include a plurality of individual batteries connected together or a plurality of battery cells. The battery 194 can include any of a lead-acid battery, a nickel-cadmium battery (NiCd), a Nickel-Metal Hydride (NiMH) battery, a Lithium-Ion (Li-ion) battery, a Nickel-Zinc (NiZn) battery, and a Lithium-Ion Polymer (LiPo) battery. The battery 194 can distribute electrical power via a direct current bus 1208. The battery 194 can be connected to the direct current bus 1208 via a switch 1202. The switch can be used to connect or disconnect the battery 194 from the direct current bus 1208.

FIG. 12 also illustrates an electrical connection to a PID controller 1104. As described above, the PID controller 1104 can control airflow control actuator 1106, which controls airflow through the cooling shroud 108. The airflow control actuator 1106 can be electrically actuated.

The hybrid power unit 100 can include a local controller 1302 configured to execute the method to control a total thrust output of the hybrid power unit 100, a temperature and efficiency of the internal-combustion engine 104, and current (or electrical power) flux through the hybrid power unit 100. In particular, the local controller 1302 can be arranged in a housing within the hybrid power unit 100 can cooperate with the electronic motor speed controller to set a speed of the primary electric motor 102, set a throttle setpoint of the internal-combustion engine 104, a set an actuator intake position for the cooling intake based on: a rotor speed command received from the primary flight controller 180 in the aerial vehicle; a state of charge of a battery 194 in the aerial vehicle (e.g., received from the primary flight controller or read directly from this battery 194); and various sensor data (e.g., a temperature of the internal-combustion engine 104).

FIG. 13 illustrates a flowchart to control a total thrust output of the hybrid power unit. The Parallel Hybrid Controller (PHC) 1302A can receive a thrust command from the primary flight controller that can be converted to a rotor speed commands, such as on a regular interval of 400 Hz (i.e., four hundred control cycles per second).

In one implementation, the electronic motor speed controller receives a rotor speed command directly from the primary flight controller 180 (e.g., via a data bus in the aerial vehicle) during a command cycle and automatically passes this rotor speed command to the local controller while executing methods described below to drive the primary electric motor 102 to the specified target rotor speed.

In one variation, the local controller receives a thrust command—specifying a target thrust output of the hybrid power unit 100—from the primary flight controller during a command cycle, converts this thrust command into a target rotor speed based on a current altitude of the aerial vehicle, and then passes this target rotor speed to the electronic motor speed controller for immediate execution.

An electronic motor speed controller 1306 can drive the primary electric motor 102 that is coupled to the rotor 106 to achieve the target rotor speed. Generally, upon receipt of the target rotor speed during a command cycle, the electronic motor speed controller 1306 can implement closed-loop controls to automatically adjust torque output and regenerative braking settings of the primary electric motor 102 in order to rapidly achieve and then maintain this target motor speed.

In one example, if the current rotor speed is less than the target rotor speed and if the primary electric motor 102 is currently in an output mode, the electronic motor speed controller 1306 can increase the current through the primary electric motor 102 in order to increase the speed of the rotor 106. However, if the current rotor speed is less than the target rotor speed and if the primary electric motor 102 is currently in a generator mode, the electronic motor speed controller can: decrease a regenerative braking setpoint of the primary electric motor 102 in order to decrease torque resistance against the internal-combustion engine 104 and thus enable the internal-combustion engine 104 to increase the speed of the rotor 106 given its current throttle setpoint, such as if the current rotor speed is slightly (e.g., 2%) less than the target rotor speed; or transition the primary electric motor 102 into the output mode and increase the current through the primary electric motor 102 to assist the primary electric motor 102 in increasing the speed of the rotor 106, such as if the current rotor speed is significantly (e.g., more than 2%) less than the target rotor speed.

Conversely, if the current rotor speed is more than the target rotor speed and if the primary electric motor 102 is currently in the output mode, the electronic motor speed controller 1306 can: decrease the voltage across the primary electric motor 102 in order to decrease the speed of the rotor 106, such as if the current rotor speed is slightly (e.g., less 50 rpm) more than the target rotor speed; or transition the primary electric motor 102 into the generator mode in order to regeneratively brake the primary electric motor 102 and thus rapidly decrease the speed of the rotor 106, such as if the current rotor speed is significantly (e.g., more than 2%) more than the target rotor speed. However, if the current rotor speed is more than the target rotor speed and if the primary electric motor 102 is currently in the generator mode, the electronic motor speed controller can increase the regenerative braking setpoint of the primary electric motor 102 in order to increase torque resistance against the internal-combustion engine 104 and thus slow the rotor 106.

The PHC 1302A can estimate a first efficiency of an engine coupled to the primary electric motor 102 based on a first engine speed of the internal-combustion engine 104 at approximately the first time and a first engine torque output of the internal-combustion engine 104 at approximately the first time. Generally, during the command cycle, the local controller 1302 can also estimate a total instantaneous rotor input torque, an instantaneous torque output of the primary electric motor 102, and an instantaneous output torque of the internal-combustion engine 104 during this command cycle.

In one implementation, the local controller 1302 can accesses a rotor model that links altitude of the aerial vehicle (which corresponds to air density) and rotor speed to total rotor input torque for the configuration of the rotor 106 (e.g., the current pitch of the blades of the rotor 106). The local controller 1302 can query the rotor model for a total rotor input torque based on the current altitude of the aerial vehicle and the current speed of the rotor 106. The local controller 1302 can also access (e.g., from the electronic motor speed controller 1306) a voltage across the primary electric motor 102 (which is a positive value regardless of the mode of the primary electric motor 102 because the hybrid power unit 100 rotates the primary electric motor 102 in only one direction during operation). The local controller 1302 can access an electrical current through the primary electric motor 102 (which is a positive value when the primary electric motor 102 is in the output mode and a negative value when in the generator mode). The local controller 1302 can multiply this voltage by this electrical current to calculate a power output of the motor (which is a positive value when the primary electric motor 102 is in the output mode and a negative value when the primary electric motor 102 is in the generator mode). The local controller 1302 can divide this power output by the current speed of the primary electric motor 102 (or the rotor 106) to calculate an instantaneous torque output of the primary electric motor 102 (which is a positive value when the motor is in the output mode and a negative value when the motor is in the generator mode). The local controller 1302 can then calculate the instantaneous torque output of the internal-combustion engine 104 by subtracting the instantaneous torque output of the primary electric motor 102 from the total rotor input torque for the current command cycle.

Alternatively, the local controller 1302 can measure the current torque output of the internal-combustion engine 104 directly via a torque sensor coupled to the internal-combustion engine 104, such as arranged between the internal-combustion engine 104 and disengagement mechanism 804.

The local controller 1302 can then calculate a speed of the internal-combustion engine 104 based on a current speed of the primary electric motor 102 and a known drive ratio between the internal-combustion engine 104 and the primary electric motor 102. The local controller 1302 can retrieve a stored engine efficiency curve (or "map") for an engine at or near the current engine speed. The local controller 1302 can query this engine efficiency curve for an estimated efficiency of the internal-combustion engine 104 during the current command cycle based on the current torque output of the internal-combustion engine 104.

In another implementation, the local controller 1302 can pass a current throttle setpoint, the current engine speed, the instantaneous speed of the rotor 106, and an instantaneous output current of the primary electric motor 102 (which represents a resistive torque output of the primary electric motor 102 when the primary electric motor 102 is regeneratively braking the rotor 106 and an assistive torque output of the primary electric motor 102 when the primary electric motor 102 is in the output mode) into a stored engine efficiency model in order to directly estimate the efficiency of the internal-combustion engine 104 during this command cycle.

However, the local controller 1302 can implement any other method or technique to estimate the current efficiency of the internal-combustion engine 104.

The local controller 1302 can calculate an efficiency-based throttle setpoint delta based on a difference between the first efficiency and a peak efficiency of the internal-combustion engine 104 at the first engine speed. Generally, the local controller 1302 can calculate a change in the throttle setpoint of the internal-combustion engine 104 predicted to increase the operating efficiency of the internal-combustion engine 104.

In one implementation, the local controller 1302 can retrieve a stored engine efficiency curve for an engine at or near the current engine speed. The local controller 1302 can read or calculate the current operating efficiency of the internal-combustion engine 104 based on this engine efficiency curve and the instantaneous torque output of the internal-combustion engine 104, as described above, and then can read or calculate a target torque output of the internal-combustion engine 104—predicted to yield a peak engine efficiency at (or near) the current engine speed—from this engine efficiency curve.

The local controller 1302 then calculates an efficiency-based throttle setpoint delta as a function of (e.g., proportional to) the difference between the actual and target torque outputs of the internal-combustion engine 104 for the current engine speed during the current command cycle. For example, the local controller 1302 can calculate a negative efficiency-based throttle setpoint delta if the actual torque output of the internal-combustion engine 104 exceeds the target torque output for the current engine speed; and vice versa.

The local controller 1302 can calculate a charge-based throttle setpoint delta based on a difference between the first battery state of charge and a target battery state of charge.

In one implementation, the local controller 1302 can read or access the current state of charge of the battery 194. The local controller 1302 can retrieve or calculate a target charge state of the battery 194. In particular, the local controller 1302 can implement a target charge state of the battery 194 that is less than fully-charged (or "100%") in order to enable battery 194 headroom for the primary electric motor 102 to slow the rotor 106 and engine through regenerative braking by dumping captured energy from the internal-combustion engine 104 and rotor into the battery 194 without overcharging the battery 194. For example, the local controller 1302 can implement a fixed target state of charge, such as 75%. Alternatively, the local controller 1302 can calculate a target state of charge for the current flight or for the current control cycle. For example, the local controller 1302 can calculate a target state of charge for the current flight proportional to a current payload of the aerial vehicle and/or inversely proportional to a remaining flight time for the current flight (e.g., because the battery 194 may be recharged at lower cost with fixed ground-based infrastructure rather than by the internal-combustion engine 104).

The local controller 1302 can then calculate a target total current draw from the battery 194 based on a difference between the actual and target states of charge of the battery 194. For example, the local controller 1302 can calculate a target total current draw—for the current command cycle—that is: proportional to a difference between the actual and target state of charge of the battery 194; negative if the actual state of charge is less than the target state of change; and positive if the actual state of charge is more than the target state of change.

The local controller 1302 can then calculate a charge-based throttle setpoint delta for the internal-combustion engine 104 as a function of (e.g., inversely proportional to) the target total current draw. For example, the local controller 1302 can calculate a positive throttle setpoint delta if the target total current draw is negative such that implementation of this positive throttle setpoint delta increases the output torque of the internal-combustion engine 104, increases regenerative braking of the primary electric motor 102 in order to maintain the rotor 106 at a current target rotor speed, and thus increases current output of the primary electric motor 102 to recharge the battery 194. Conversely, the local controller 1302 can calculate a negative throttle setpoint delta if the target total current draw is positive such that implementation of this negative throttle setpoint delta decreases the output torque of the internal-combustion engine 104, increases a torque output of the primary electric motor 102 in order to maintain the rotor 106 at a current target rotor speed, and thus increases current draw of the primary electric motor 102 to reduce the charge state of the battery 194.

The local controller 1302 can perform a method to drive a throttle actuator, coupled to an internal-combustion engine 104 that is coupled to the rotor 106, to a new throttle setpoint based on a combination of the efficiency-based throttle setpoint delta and the charge-based throttle setpoint delta.

In one implementation, the local controller 1302 can merge the efficiency-based throttle setpoint delta, the charge-based throttle setpoint delta, and/or the temperature-based throttle setpoint delta with the current throttle setpoint of the internal-combustion engine 104 in order to calculate a new target throttle setpoint for the internal-combustion engine 104. In one example, the local controller 1302: sums the efficiency-based throttle setpoint delta, the charge-based throttle setpoint delta, the temperature-based throttle setpoint delta, and the current throttle setpoint of the internal-combustion engine 104 to calculate the new target throttle setpoint delta for the current command cycle.

In another implementation, the local controller 1302 weights these throttle setpoint deltas. For example, the local controller 1302 can: weight the efficiency-based throttle setpoint delta inversely proportional to the current fuel fill level of the aerial vehicle; weight the charge-based throttle setpoint delta proportional to the current payload carried by the aerial vehicle; and then sum the weighted efficiency-based throttle setpoint delta, the weighted charge-based throttle setpoint delta, and the current throttle setpoint of the internal-combustion engine 104 to calculate the new target throttle setpoint delta for the current command cycle.

The local controller 1302 can then drive a throttle actuator—coupled to the internal-combustion engine 104—to this new target throttle setpoint.

In one implementation, the local controller 1302 implements closed-loop controls to vary the throttle setpoint of the internal-combustion engine 104 and the power output of the primary electric motor 102 to maintain the rotor 106 at a target rotor speed based on a torque output of the internal-combustion engine 104 at a target engine efficiency at the corresponding engine speed, an estimated torque output of the primary electric motor 102, and an estimated torque input to the rotor 106 to maintain this rotor speed.

For example, the local controller 1302 can receive a target rotor speed from the primary flight controller 180. The local controller 1302 can calculate a target rotor speed based on a total thrust value or an uncorrected rotor speed received from the primary flight controller 180, such as described below. The local controller 1302 can then calculate a target engine speed corresponding to the target rotor speed (e.g., based on a known gear or pulley ratio between the internal-combustion engine 104 output shaft 406 and the rotor 106). The local controller 1302 can reference the internal-combustion engine 104 efficiency curve described above to calculate a target engine torque corresponding to target (e.g., maximum) engine efficiency at the target engine speed. The local controller 1302 can similarly store a rotor input torque curve (or "map") that predicts a torque required to rotate the rotor 106 at a particular rotor speed, such as based on altitude, barometric pressure, and/or humidity. The local controller 1302 can reference this rotor input torque curve to estimate a rotor input torque necessary to rotate the rotor 106 at the target rotor speed (e.g., based on the current altitude of the aerial vehicle, a current barometric pressure, and/or a current humidity). The local controller 1302 can also estimate a current motor torque output by the primary electric motor 102 based on a current supplied to the primary electric motor 102 (e.g., measured by an ammeter connected to the primary electric motor 102), the voltage across the primary electric motor 102, and/or the resistance of the primary electric motor 102.

Then, in response to the target engine torque exceeding the estimated rotor input torque, the local controller 1302 can: transition the primary electric motor 102 to the regenerative braking state; implement closed-loop controls to adjust the braking rate of the primary electric motor 102 on short time intervals (e.g., 100 milliseconds, 500 milliseconds) to regeneratively brake the rotor 106 to the target rotor speed; and implement closed-loop controls to adjust the throttle setpoint of the internal-combustion engine 104 on longer time intervals (e.g., one second, two seconds) to maintain the motor torque of the primary electric motor 102—opposite the direction of rotation of the rotor 106—at (or near, proximal) a difference between the target engine torque and the rotor input torque. The local controller 1302 can thus brake the primary electric motor 102 at different rates and adjust the throttle setpoint of the internal-combustion engine 104 in order to match the torque of the primary electric motor 102—resisting rotation of the rotor 106—to the difference between a) the estimated torque necessary to rotate the rotor 106 at the target speed and b) the target engine torque, thereby maintaining the rotor 106 at the target rotor speed, maintaining the internal-combustion engine 104 within a target operating efficiency range, and recharging the battery 194 in the aerial vehicle.

Similarly, in response to the estimated rotor input torque exceeding the target engine torque, the local controller 1302 can transition the primary electric motor 102 to the power output state. The local controller 1302 can implement closed-loop controls to drive the primary electric motor 102 to output torque, in the direction of rotation of the rotor 106, to advance the rotor 106 to the target rotor speed on short time intervals. The local controller 1302 can implement closed-loop controls to adjust the throttle setpoint of the internal-combustion engine 104 on longer time intervals to maintain the motor torque of the primary electric motor 102—in the direction of rotation of the rotor 106—at (or near, proximal) the difference between the target engine torque and the rotor input torque. The local controller 1302 can thus drive the primary electric motor 102 at different output torques and adjust the throttle setpoint of the internal-combustion engine 104 in order to match the torque output by the primary electric motor 102— in the direction of rotation of the rotor 106—to the difference between a) the estimated torque necessary to rotate the rotor 106 at the target speed and b) the target engine torque, thereby maintaining the rotor 106 at the target rotor speed and maintaining the internal-combustion engine 104 within the target operating efficiency range while discharging the battery 194 in the aerial vehicle.

FIG. 13 illustrates a flowchart to control a total thrust output of the hybrid power unit 100. Each of the hybrid power units 100 can include a controller 1302 (e.g., a Parallel Hybrid Controller (PHC) controller). The controller 1302 can receive inputs from the primary flight controller 180. The inputs of the primary flight controller 180 can determine a total required thrust to achieve the commanded flight control inputs. The controller 1302 can determine a speed of a primary electric motor 102 and a throttle setpoint for the internal-combustion engine 104 to achieve the total required thrust.

In various embodiments, the controller 1302 can receive a number that is scaled from zero (0) to one-hundred percent (100%) that correlates to thrust from the flight controller. In various embodiments the number can be interpreted as a speed of the rotor 106 with a rotor 106 that is fixed-pitch. In various embodiments, the number can be unitless. The controller 1302 converts the number into a speed that the rotor 106 needs to spin to achieve a desired thrust. The number can be measured in rotations per minute. The number can be measured in radians per second. The desired speed can be sent to the motor controller to control the speed of the rotor 106 regardless of the load. For example, if the hybrid power unit 100 is at 1500 meters altitude, the motor controller will automatically adjust the current accordingly. For example, it will take less current at the primary electric motor 102 to spin the rotor 106 to that speed. For example, if the hybrid power unit 100 is at a lower altitude the hybrid power unit 100 will require more current to maintain the same speed.

And then, in parallel with that, the controller 1302 is going to calculate a throttle set point and that throttle setpoint is going to correlate to two things: (1) the throttle setpoint is going to correlate to the speed that the system wants the propeller to be running at and (2) the current that you want that specific arm to be generating or consuming. The controller 1302 can be given two external numbers; (1) desired thrust, and (2) a module current. The module current is the current that the controller 1302 is trying to attain. The module current can be calculated locally; based on the system state of charge, the local controller can calculate what that module should be doing or it can be provided instructions externally (e.g., another controller).

The controller 1302 receives that information and determines the electrical power that the hybrid power unit 100 should be (1) consuming and/or generating. The controller 1302 can adjust the throttle of the internal-combustion engine 104 to achieve that current. This can be done in two stages. In the first stage, the controller 1302 can calculate a feed forward where it determined that at a given rotations per minute (RPM), the engine throttle needs to be at this setting in order to achieve zero current. The controller 1302 can adjust the throttle to that setting. The controller 1302 can implement an additional control loop that will make smaller adjustments to the throttle to achieve a specific regeneration or consumption of electrical power.

In various embodiments, the controller 1302 can calculate an engine throttle from rotor speed and module current. This can be calculated by using lookup tables, such as a two-dimensional look-up table and a three-dimensional lookup table. In various embodiments, this can be done using a proportional-integral-derivative (PID) controller. In various embodiments, this can be done using a feed-forward controller.

In a preferred way, the controller 1302 can calculate engine throttle based on rotor speed. The throttle setting can be determined using a look-up table. On top of that, the controller can use a PID control system to make the small adjustments to achieve the specific current that is commanded by the controller 1302.

The next part of the controller 1302 is temperature control of the internal-combustion engine 104. The controller 1302 can include a closed-loop temperature control that can modulate the amount of air flowing across the engine heads to achieve a specific engine temperature as described above.

In various embodiments, the controller 1302 can receive and monitor electric motor current, a current RPM, a RPM setpoint, a change in setpoint, an engine throttle, and a change in the engine throttle setting. These received values can be combined into a single algorithm that calculates a fault factor value that can be normalized to provide a scale of the likelihood that the internal-combustion engine 104 has failed. The values can be derivative and subsequent derivatives thereof, meaning that values can be based on changes in motor current, changes in propeller speed, changes in throttle position and changes in prop setpoint. The controller 1302 can calculate a number, and if that number is greater than a predefined threshold, the controller can determine a likelihood that the internal-combustion engine 104 has failed is above a pre-determined threshold and can disengage the disengagement mechanism 800 at that point. The fault factor can be non-linear and when the fault-factor has been reached the disengagement mechanism 800 can disengage the internal-combustion engine.

In various embodiments, a neural network can receive an arbitrary number of parameters from the internal-combustion engine 104 and the primary electric motor 102, and even possibly environmental factors, and the neural network can be optimized to identify a number of different engine failure mechanisms.

In a second approach, a neural network can receive an arbitrary number of parameters from the primary electric motor 102, and the internal-combustion engine 104, and environmental measurements in order to identify more than one different failure scenario. Each of those failure scenarios can include different approaches in terms of disengagement versus engagement, versus pilot warning or automated landing.

The control system can include an initial calibration to obtain the numbers the controller 1302 needs to operate in a controlled environment as the rotor 106 steps through different propeller speeds measured in rotations per minute. The primary electric motor 102 can be placed into a speed control mode to set a rotor speed. The controller 1302 can let the PID loop settle on a zero current settle to the point. At this point the controller can adjust the throttle to get the current to be zero. Once the current is zero, the controller can store that throttle set point in order to generate a look-up table. The controller 1302 can move on to the next rotor speed, and the next rotor speed, the controller 1302 can generate a lookup table of arbitrary precision with any number of points. The lookup table can be stored in a memory. The controller 1302 can interpolate between the points to determine an engine throttle setting. In various embodiments, the look up table can also be generated with a non-zero current set point to reflect average avionics current draw.

Turning to FIG. 13, the controller 13022 can include a first PHC 1302A for one of four hybrid power units. A second PHC 1302B can control a second hybrid power unit. A third PHC 1302C can control a third hybrid power unit. A fourth PHC 1302D can control a fourth hybrid power unit. Additional PHCs can be used to control additional hybrid power units.

The first PHC 1302A can receive the commanded thrust from the primary flight controller 180 and can calculate a prop/rotor speed 1304. The PHC 1302A can send the prop speed setpoint to the motor speed controller 1306. The motor speed controller 1306 can control the primary electric motor 102.

The first PHC 1302A can determine a first throttle setpoint using a look up table based on prop speed 1304. The first throttle setpoint can be sent to a summing module 1328. The summing module 1328 can also receive a second summing module from a module current PID 1326. The summing module 1328 can determine a final throttle setpoint. The final throttle setpoint can be sent to a throttle actuator 1330. The throttle actuator 1330 can control the power of the internal combustion engine 104.

The first PHC 1302A can receive a module current setpoint of each of the second PHC 1302B, the third PHC 1302C, and the fourth PHC 1302D. Each PHC can receive the module current setpoint from each of the sibling PHCs on the network. Each PHC can also receive the state of the battery 194. Each PHC can determine a state of charge of the battery 194 using a state of charge calculator 1316. A state of charge setpoint 1314 can be stored in a memory. A battery charge summing module 1318 can receive both the state of charge of the battery and the state of charge setpoint 1314 to determine a state of charge error. A module current setpoint calculation 1320 can be determined based in part on the state of charge error.

The module current setpoint calculation can get sent to a setpoint selection decision module 1322. The setpoint selection decision module 1322 can also receive the module current setpoints from the sibling PHCs on the network. The setpoint selection decision module 1322 can determine a module current setpoint. A current setpoint summing module can receive the module current setpoint and a motor current reading from the motor speed controller 1306. The current setpoint summing module can determine a module current error. The module current error can be sent to the module current PID 1326.

Figure 14:
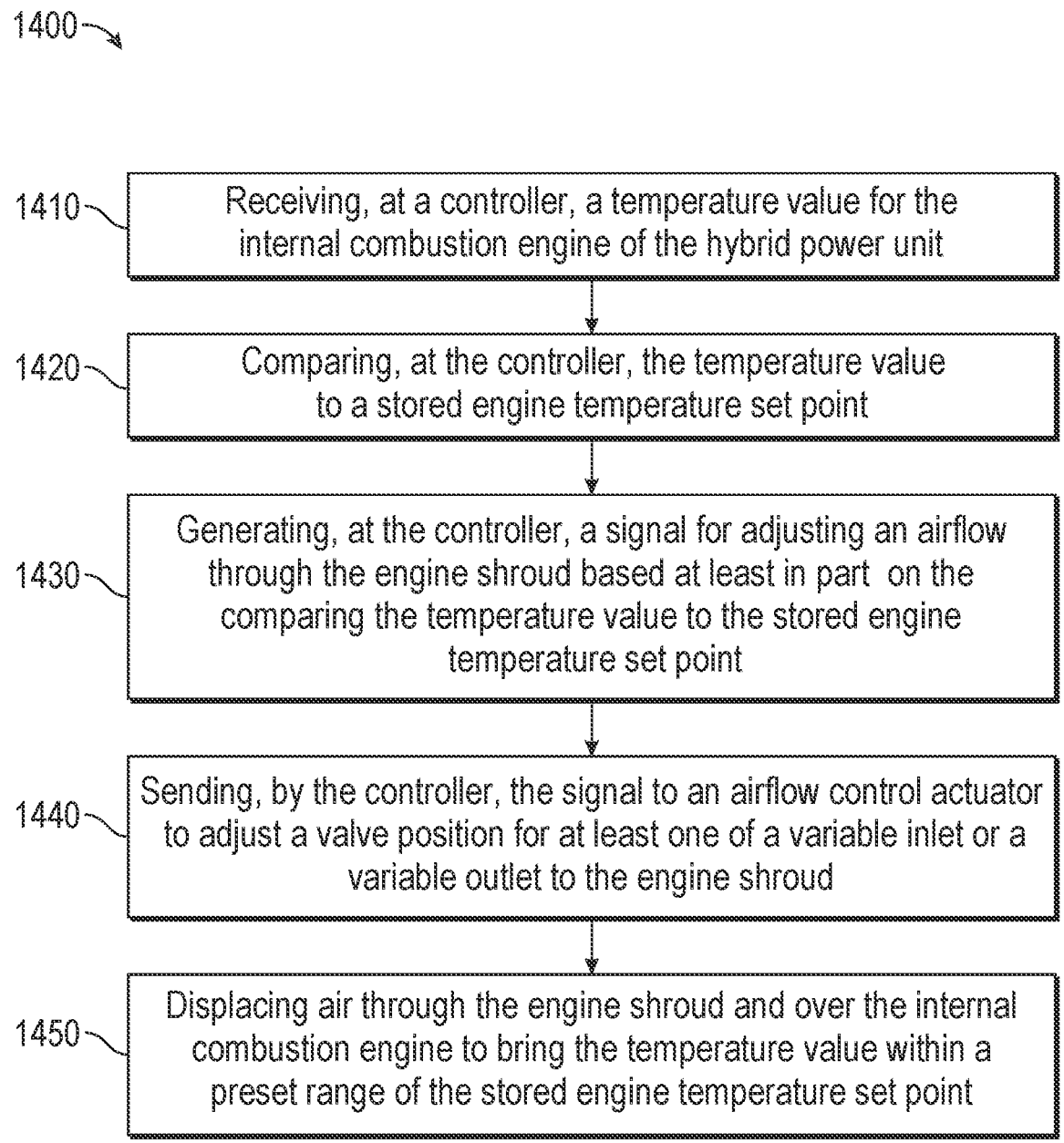
FIG. 14 is a flowchart of an example process for cooling an internal-combustion engine of a hybrid power unit.

FIG. 14 is a flowchart of an example process 1400 for cooling an internal-combustion engine of a hybrid power unit. In some implementations, one or more process steps of FIG. 14 may be performed by a controller (e.g., PID controller 1104 as shown in FIG. 11). In some implementations, one or more process steps of FIG. 14 may be performed by another device or a group of devices separate from or including the PID controller 1104. Additionally, or alternatively, one or more process steps of FIG. 14 may be performed by one or more components of the PID controller 1104, such as a processor, a memory, a storage component, an input component, an output component, and/or communication interface.

At step 1410, process 1400 can include receiving, at a controller, a temperature value for the internal-combustion engine of the hybrid power unit.

At step 1420, process 1400 can include comparing, at the controller, the temperature value to a stored engine temperature set point.

At step 1430, process 1400 can include generating, at the controller, a signal for adjusting an airflow through the cooling shroud based at least in part on comparing the temperature value to the stored engine temperature set point.

At step 1440, process 1400 can include sending, by the controller, the signal to an airflow control actuator to adjust a valve position for at least one of a variable inlet or a variable outlet to the cooling shroud.

At step 1450, process 1400 can include displacing air through the cooling shroud and over the internal-combustion engine to bring the temperature value within a preset range of the stored engine temperature set point.

Although FIG. 14 shows example steps of process 1400, in some implementations, process 1400 may include additional steps, fewer steps, different steps, or differently arranged steps than those depicted in FIG. 14. Additionally, or alternatively, two or more of the steps of process 1400 may be performed in parallel.

Figure 15:
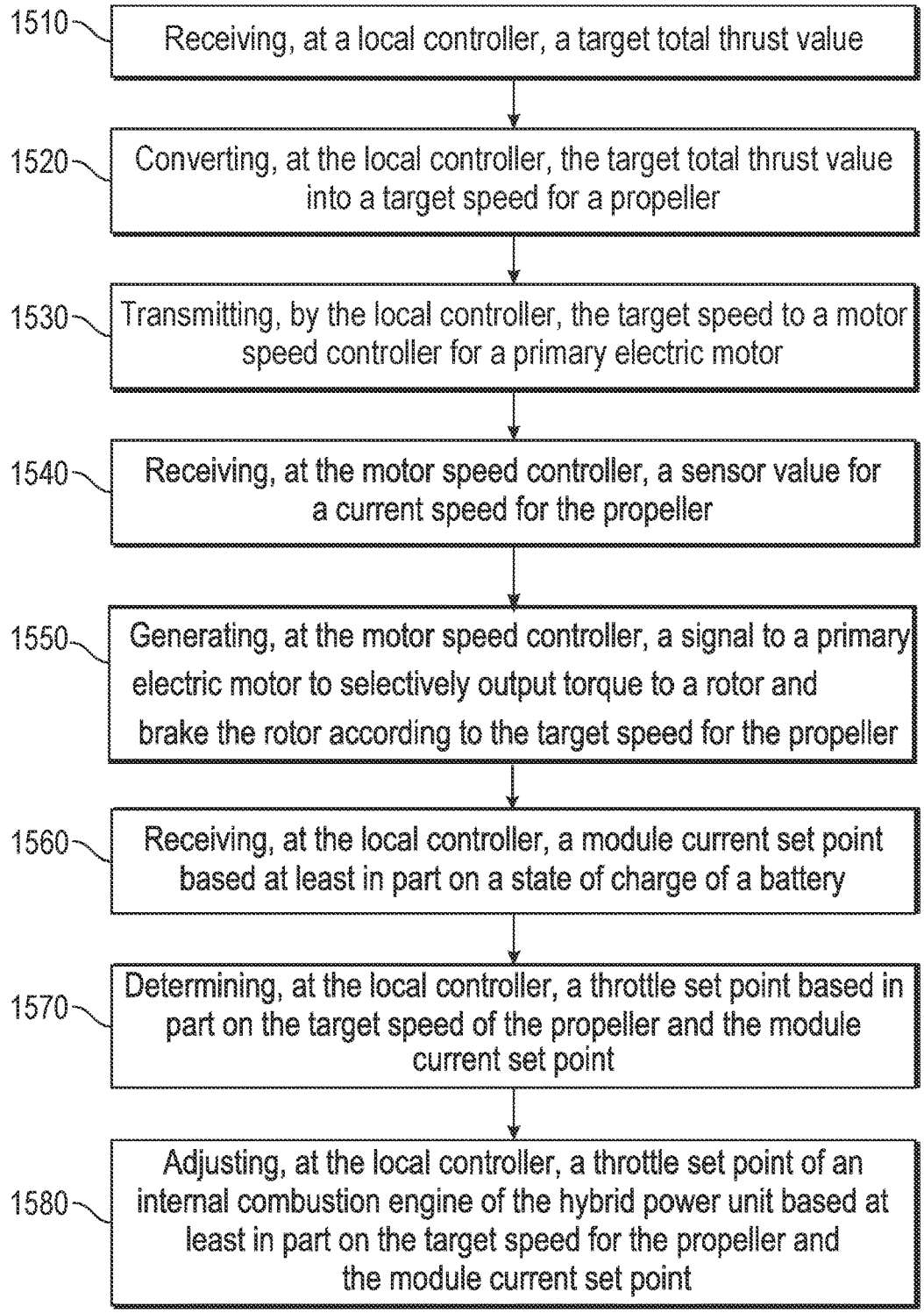
FIG. 15 is a flowchart of an example process with a power module for unmanned aircraft systems.

FIG. 15 is a flowchart of an example process 1500 associated with the power module and disengagement mechanism for unmanned aircraft systems. In some implementations, one or more process steps of FIG. 15 may be performed by a controller (e.g., controller 1302 as shown in FIG. 2). In some implementations, one or more process steps of FIG. 15 may be performed by another device or a group of devices separate from or including the controller 1302. Additionally, or alternatively, one or more process steps of FIG. 15 may be performed by one or more components of the controller 1302, such as a processor, a memory, a storage component, an input component, an output component, and/or communication interface.

At step 1510, process 1500 may include receiving, at a local controller 1302, a target total thrust value. For example, the controller may receive, at a local controller 1302, a target total thrust value, as described above.

At step 1520, process 1500 may include converting, at the local controller 1302, the target total thrust value into a target speed for a propeller. For example, the controller may convert, at the local controller 1302, the target total thrust value into a target speed for a propeller, as described above.

At step 1530, process 1500 may include transmitting the target speed to a motor speed controller for a primary electric motor. For example, the controller may transmit the target speed to a motor speed controller for a primary electric motor, as described above.

At step 1540, process 1500 may include receiving, at the motor speed controller, a sensor value for a current speed for the propeller. For example, the controller may receive, at the motor speed controller, a sensor value for a current speed for the propeller, as described above.

At step 1550, process 1500 may include generating, at the motor speed controller, a signal to a primary electric motor to selectively output torque to a rotor and regeneratively brake the rotor according to the target speed for the propeller. For example, the controller may generate, at the motor speed controller, a signal to a primary electric motor to selectively output torque to a rotor and regeneratively brake the rotor according to the target speed for the propeller, as described above.

At step 1560, process 1500 may include receiving, at the local controller 1302, a module current set point based at least in part on a state of charge of a battery. For example, the controller may receive, at the local controller 1302, a module current set point based at least in part on a state of charge of a battery, as described above.

At step 1570, process 1500 may include determining, at the local controller 1302, a throttle set point based in part on the target speed of the propeller and the module current set point. For example, the controller may determine, at the local controller 1302, a throttle set point based in part on the target speed of the propeller and the module current set point, as described above.

At step 1580, process 1500 may include adjusting, at the local controller 1302, a throttle set point of an internal-combustion engine of the hybrid power unit based at least in part on the target speed for the propeller and the module current set point. For example, the controller may adjust, at the local controller 1302, a throttle set point of an internal-combustion engine of the hybrid power unit based at least in part on the target speed for the propeller and the module current set point, as described above.

Process 1500 may include additional implementations, such as any single implementation or any combination of implementations described below and/or in connection with one or more other processes described elsewhere herein.

In a first implementation, process 1500 includes generating a final throttle set point signal based at least in part on the throttle set point, and sending the final throttle set point signal directly or indirectly to a throttle actuator.

In a second implementation, process 1500 includes estimating, at the local controller 1302, a secondary thrust output from a shroud output based at least in part on a rotation speed of an internal-combustion engine.

In a third implementation, the module current set point is based at least in part on a second module current set point from a second local controller 1302.

In a fourth implementation, process 1500 includes detecting, via one or more sensors, a condition of the primary electric motor or a secondary internal-combustion engine, and generating a signal in response to the detected condition.

Although FIG. 15 shows example steps of process 1500, in some implementations, process 1500 may include additional steps, fewer steps, different steps, or differently arranged steps than those depicted in FIG. 15. Additionally, or alternatively, two or more of the steps of process 1500 may be performed in parallel.

Therefore, in this example, the local controller 1302 can implement closed-loop controls to adjust the pitch of the rotor 106 based on: a target rotor speed or target total thrust specified by the primary flight controller 180; the state of charge of the battery 194; and the estimated efficiency of the internal-combustion engine 104.

The systems and methods described herein can be embodied and/or implemented at least in part as a machine configured to receive a computer-readable medium storing computer-readable instructions. The instructions can be executed by computer-executable components integrated with the application, applet, host, server, network, web site, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as random access memory (RAM), read-only memory (ROM), flash memory, electrically erasable programmable read-only memory (EEPROM), optical devices (compact disc (CD) or digital video disc (DVD)), hard drives, floppy drives, or any suitable device. The computer-executable component can be a processor but any suitable dedicated hardware device can (alternatively or additionally) execute the instructions.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. In addition, features described with respect to certain configurations may be combined in various other configurations. Different aspects and elements of the configurations may be combined in a similar manner. In addition, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

In addition, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the disclosure. In addition, a number of steps may be undertaken before, during, or after the above elements are considered.

As a person skilled in the art will recognize from the previous detailed description and from the figures and claims, modifications and changes can be made to the embodiments of the disclosure without departing from the scope of this disclosure as defined in the following claims.

What is claimed is:

1. A hybrid power unit, comprising:
   a primary electric motor including a motor output shaft;
   a primary thrust-providing propeller drivingly coupled to the motor output shaft;
   a speed reduction mechanism;
   an internal-combustion engine comprising an output element drivingly coupled to a torsion shaft, wherein the torsion shaft is drivingly coupled to the speed reduction mechanism;
   a disengagement mechanism interposed between the speed reduction mechanism and the motor output shaft and configured to selectively transfer torque between the speed reduction mechanism and the motor output shaft, wherein a default configuration of the disengagement mechanism is a closed configuration in which the speed reduction mechanism is driving coupled to the motor output shaft;
   a cooling shroud extending over the internal-combustion engine and defining a shroud inlet and a cooling shroud outlet; and
   a cooling fan driven by the internal-combustion engine and configured to displace air through the cooling shroud and over the internal-combustion engine and through the cooling shroud outlet thereby providing cooling and additional thrust.

2. The hybrid power unit of claim 1, wherein the disengagement mechanism is a bi-directional clutch.

3. The hybrid power unit of claim 1, further comprising a solenoid in the disengagement mechanism to selectively engage or disengage the motor output shaft from the speed reduction mechanism.

4. The hybrid power unit of claim 1, wherein the disengagement mechanism comprises one or more dogs, wherein the one or more dogs are angled with respect to a top surface of the disengagement mechanism in order to reduce friction between faces of the disengagement mechanism to allow for disconnection under load.

5. The hybrid power unit of claim 1, further comprising a solenoid configured to disengage and re-engage the disengagement mechanism, wherein a magnetic coil of the solenoid is energized to disengage a dog portion of the disengagement mechanism and cooperates with a permanently magnetized ring to keep the disengagement mechanism disengaged even after the magnetic coil is de-energized.

6. The hybrid power unit of claim 1, wherein the torsion shaft further comprises quill coaxial shafts to reduce an amplitude of torque pulses from the internal-combustion engine, the quill coaxial shafts comprising:
   an inner coaxial shaft coupled to the motor output shaft; and
   an outer coaxial shaft encircling the inner coaxial shaft and connected at a distal end of the outer coaxial shaft to the inner coaxial shaft and a proximal end of the outer coaxial shaft coupled to a sun gear, wherein the outer coaxial shaft and the inner coaxial shaft transmit torque from the internal-combustion engine to the speed reduction mechanism.

7. The hybrid power unit of claim 1, wherein the primary electric motor is configured to transmit torque bi-directionally to the motor output shaft and from the motor output shaft.

8. The hybrid power unit of claim 1, further comprising:
   a position sensing system configured to detect a position of a plurality of dogs of the disengagement mechanism relative to a plurality of dog receivers prior to re-engaging the plurality of dogs with the plurality of dog receivers.

9. The hybrid power unit of claim 1, further comprising an airflow control actuator operable to modulate cooling of the internal-combustion engine by modulating a level of airflow through the cooling shroud.

10. The hybrid power unit of claim 1, further comprising a local controller configured to perform a method for cooling an internal-combustion engine of a hybrid power unit, the method comprising:
    receiving, at an airflow controller, a temperature value for the internal-combustion engine of the hybrid power unit;
    comparing, at the airflow controller, the temperature value to a stored engine temperature set point;
    generating, at the airflow controller, a signal for adjusting an airflow through the cooling shroud based at least in part on the comparing the temperature value to the stored engine temperature set point;
    sending, by the airflow controller, the signal to an airflow control actuator to adjust a valve position for at least one of a variable inlet or a variable outlet to the cooling shroud; and
    displacing air through the cooling shroud and over the internal-combustion engine to bring the temperature value within a preset range of the stored engine temperature set point.

11. An aerial vehicle comprising a plurality of hybrid power units of claim 1.

12. The aerial vehicle of claim 11, further comprising a plurality of mounting arms, wherein each of the mounting arms comprises a plurality of mounting points via which a respective one of the plurality of hybrid power units is secured to the mounting arm.

13. A hybrid power unit, comprising:
a primary electric motor including a motor output shaft;
a primary thrust-providing propeller drivingly coupled to the motor output shaft;
an internal-combustion engine comprising an output element;
a disengagement mechanism interposed between the output element and the motor output shaft and configured to selectively drivingly couple the output element with the motor output shaft;
a cooling shroud extending over the internal-combustion engine and defining a shroud inlet and a cooling shroud outlet;
a cooling fan driven by the internal-combustion engine and configured to displace air through the cooling shroud and over the internal-combustion engine and through the cooling shroud outlet thereby providing cooling and additional thrust; and
a solenoid configured to disengage and re-engage the disengagement mechanism, wherein a magnetic coil of the solenoid is energized to disengage a dog portion of the disengagement mechanism and cooperates with a permanently magnetized ring to keep the disengagement mechanism disengaged even after the magnetic coil is de-energized.

14. A hybrid power unit, comprising:
a primary electric motor including a motor output shaft;
a primary thrust-providing propeller drivingly coupled to the motor output shaft;
an internal-combustion engine comprising an output element drivingly coupled to a torsion shaft;
a disengagement mechanism interposed between the torsion shaft and the motor output shaft and configured to selectively transfer torque between the torsion shaft and the motor output shaft;
a cooling shroud extending over the internal-combustion engine and defining a shroud inlet and a cooling shroud outlet; and
a cooling fan driven by the internal-combustion engine and configured to displace air through the cooling shroud and over the internal-combustion engine and through the cooling shroud outlet thereby providing cooling and additional thrust,
wherein the torsion shaft further comprises quill coaxial shafts to reduce an amplitude of torque pulses from the internal-combustion engine, and wherein the quill coaxial shafts comprise:
an inner coaxial shaft coupled to the motor output shaft; and
an outer coaxial shaft encircling the inner coaxial shaft and connected at a distal end of the outer coaxial shaft to the inner coaxial shaft and a proximal end of the outer coaxial shaft coupled to a sun gear, wherein the outer coaxial shaft and the inner coaxial shaft transmit torque from the internal-combustion engine to the motor output shaft.

15. A hybrid power unit, comprising:
a primary electric motor including a motor output shaft;
a primary thrust-providing propeller drivingly coupled to the motor output shaft;
an internal-combustion engine comprising an output element;
a disengagement mechanism interposed between the output element and the motor output shaft and configured to selectively drivingly couple the output element with the motor output shaft;
a cooling shroud extending over the internal-combustion engine and defining a shroud inlet and a cooling shroud outlet;
a cooling fan driven by the internal-combustion engine and configured to displace air through the cooling shroud and over the internal-combustion engine and through the cooling shroud outlet thereby providing cooling and additional thrust; and
a position sensing system configured to detect a position of a plurality of dogs of the disengagement mechanism relative to a plurality of dog receivers prior to re-engaging the plurality of dogs with the plurality of dog receivers.

16. A hybrid power unit, comprising:
a primary electric motor including a motor output shaft;
a primary thrust-providing propeller drivingly coupled to the motor output shaft;
an internal-combustion engine comprising an output element;
a disengagement mechanism interposed between the output element and the motor output shaft and configured to selectively drivingly couple the output element with the motor output shaft;
a cooling shroud extending over the internal-combustion engine and defining a shroud inlet and a cooling shroud outlet;
a cooling fan driven by the internal-combustion engine and configured to displace air through the cooling shroud and over the internal-combustion engine and through the cooling shroud outlet thereby providing cooling and additional thrust; and
a local controller configured to perform a method for cooling an internal-combustion engine of a hybrid power unit, the method comprising:
receiving, at an airflow controller, a temperature value for the internal-combustion engine of the hybrid power unit;
comparing, at the airflow controller, the temperature value to a stored engine temperature set point;
generating, at the airflow controller, a signal for adjusting an airflow through the cooling shroud based at least in part on the comparing the temperature value to the stored engine temperature set point;
sending, by the airflow controller, the signal to an airflow control actuator to adjust a valve position for at least one of a variable inlet or a variable outlet to the cooling shroud; and
displacing air through the cooling shroud and over the internal-combustion engine to bring the temperature value within a preset range of the stored engine temperature set point.

* * * * *